US012598123B2

(12) United States Patent
Matthews et al.

(10) Patent No.: US 12,598,123 B2
(45) Date of Patent: Apr. 7, 2026

(54) OPERATIONAL STATISTICS ENCODING AND MAPPING IN NETWORK NODES

(71) Applicant: Marvell Asia Pte, Ltd., Singapore (SG)

(72) Inventors: William Brad Matthews, Los Gatos, CA (US); Rupa Budhia, San Jose, CA (US); Meg Pei Lin, Saratoga, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 317 days.

(21) Appl. No.: 18/227,464

(22) Filed: Jul. 28, 2023

(65) Prior Publication Data

US 2024/0257262 A1     Aug. 1, 2024

Related U.S. Application Data

(60) Provisional application No. 63/441,692, filed on Jan. 27, 2023.

(51) Int. Cl.
*H04L 12/00*     (2006.01)
*H04L 41/00*     (2022.01)
(Continued)

(52) U.S. Cl.
CPC .......... *H04L 43/0876* (2013.01); *H04L 41/00* (2013.01); *H04L 43/04* (2013.01)

(58) Field of Classification Search
CPC ..... H04L 43/0876; H04L 41/00; H04L 43/04; H04L 1/0041; H04L 43/0888;
(Continued)

(56) References Cited

U.S. PATENT DOCUMENTS 6,381,642 B1     4/2002  O'Donnell et al.
7,953,114 B2 *   5/2011  Williams .............. H04L 1/0041
                                             370/254
(Continued)

FOREIGN PATENT DOCUMENTS

CA           2627304 A1 *  1/2008  ............. H04L 51/58
WO     WO-03005591 A1 *  1/2003  ........ H03M 13/2963
(Continued)

OTHER PUBLICATIONS

Christoph Hardegen, "Intent-Driven Path State Monitoring To Enable Centralized State-Aware Flow Steering", 2022 18th International Conference On Network And Service Managment (CNSM), IFIP, Oct. 31, 2022 (Oct. 31, 2022), pp. 352-358, XP034240889, DOI: 10.23919/CNSM55787.2022.9965141.
(Continued)

*Primary Examiner* — Frantz Coby
(74) *Attorney, Agent, or Firm* — Shield Intellectual Property PC; Zhichong Gu

(57)     ABSTRACT
A pre-scaled accumulated byte count of a port of a network node over a sampling period is scaled with a scaling factor to generate a scaled accumulated byte count. The pre-scaled accumulated byte count represents a total number of bytes in packets transferred by the port. The scaling factor represents a first port-specific attribute of the port and scales a port-specific maximum throughput of the port to a specific maximum port throughput of the network node. An iterative vector encoding method is applied to the scaled accumulated byte count to generate an encoded bit vector comprising bits respectively ordered bit positions. Each set bit of the encoded bit vector represents a respective weighted value of port utilization of the port. The encoded bit vector is stored, at a map location, in an operational statistics map.

20 Claims, 8 Drawing Sheets scale an accumulated byte count to generate a scaled accumulated byte count 502 apply an iterative vector encoding method to generate an encoded bit vector 504 store the encoded bit vector in an operational statistics map 506

(51) Int. Cl.
H04L 43/04 (2022.01)
H04L 43/0876 (2022.01)

(58) Field of Classification Search
CPC ....... H04L 69/22; H04L 1/0076; H04L 51/58; H03M 13/00; H03M 13/1105; H03M 13/2963; H04W 4/12
USPC .......................................... 709/238; 370/232
See application file for complete search history.

(56) References Cited

U.S. PATENT DOCUMENTS

| | | | | |
|---|---|---|---|---|
| 8,009,696 | B2 * | 8/2011 | Williams | H04L 1/0026 |
| | | | | 370/254 |
| 10,361,721 | B1 * | 7/2019 | Lo | H03M 13/29 |
| 10,880,731 | B2 * | 12/2020 | Gitlin | H04L 45/16 |
| 11,005,498 | B1 * | 5/2021 | Lo | H03M 13/1105 |
| 11,283,467 | B1 * | 3/2022 | Lo | H03M 13/31 |
| 12,010,200 | B1 * | 6/2024 | Lo | H03M 13/00 |
| 2003/0233472 | A1 * | 12/2003 | Tundlam | H04L 9/40 |
| | | | | 709/238 |
| 2008/0304483 | A1 * | 12/2008 | Williams | H04L 69/22 |
| | | | | 370/389 |
| 2010/0220728 | A1 * | 9/2010 | Williams | H04L 43/0888 |
| | | | | 370/394 |
| 2018/0069734 | A1 * | 3/2018 | Soriano | H04L 27/3488 |
| 2019/0313245 | A1 * | 10/2019 | Gitlin | H04L 1/0041 |
| 2021/0126736 | A1 * | 4/2021 | Hugosson | G06T 9/00 |
| 2021/0306098 | A1 * | 9/2021 | Zhang | H04L 1/0009 |
| 2023/0198666 | A1 * | 6/2023 | Zheng | H04L 1/0057 |
| | | | | 370/310 |

FOREIGN PATENT DOCUMENTS

| | | | | |
|---|---|---|---|---|
| WO | WO-2008007984 A2 * | 1/2008 | | H04W 4/12 |
| WO | WO-2011107963 A1 * | 9/2011 | | H04L 1/0041 |
| WO | WO-2018100416 A1 * | 6/2018 | | H04L 1/0076 |

OTHER PUBLICATIONS

Pano et al., "Workload-Aware Routing (WAR) For Network-On-Chip Lifetime Improvement", 2018 IEEE International Symposium On Circuits And Systems (ISCAS), IEEE, May 27, 2018 (May 27, 2018), pp. 1-5, XP033435065, DOI: 10.1109/ISCAS.2018.8351621.
World Intellectual Property Organization, Application No. PCT/US24/12987, International Search Report dated Apr. 3, 2024.

* cited by examiner

FIG. 2D

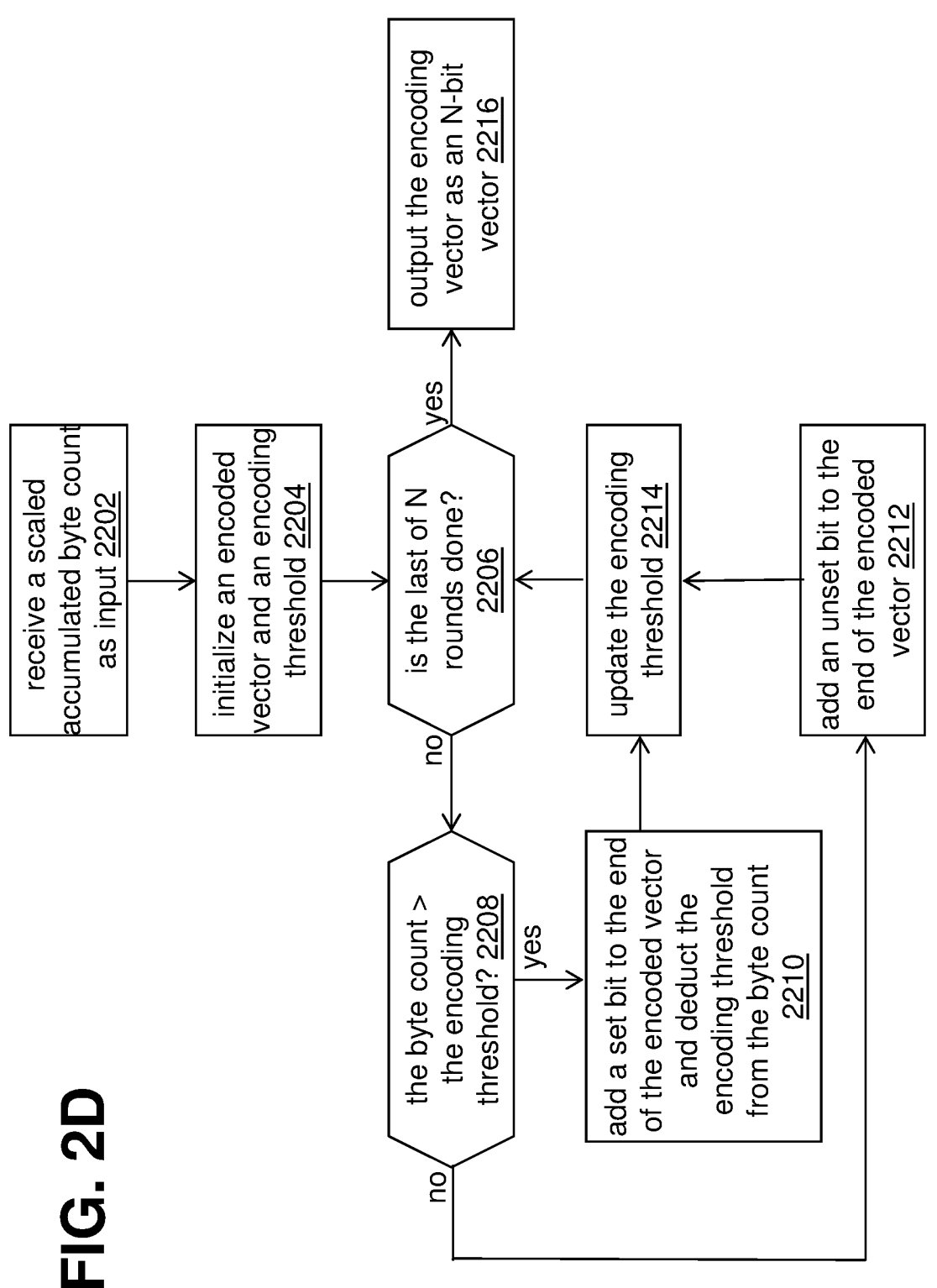

receive a scaled accumulated byte count as input 2202 initialize an encoded vector and an encoding threshold 2204 is the last of N rounds done? 2206 yes → output the encoding vector as an N-bit vector 2216 no the byte count > the encoding threshold? 2208 yes → add a set bit to the end of the encoded vector and deduct the encoding threshold from the byte count 2210 no update the encoding threshold 2214 add an unset bit to the end of the encoded vector 2212

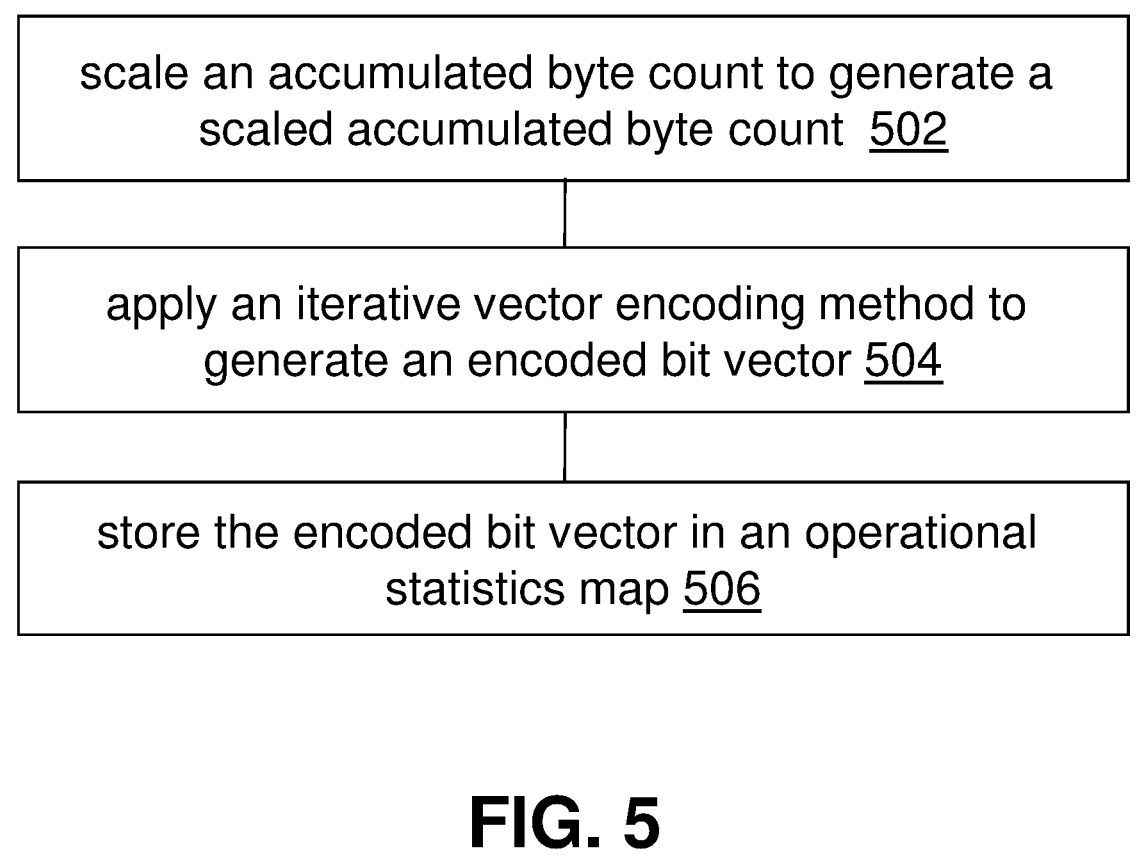

```
┌─────────────────────────────────────────────┐
│  scale an accumulated byte count to generate a │
│    scaled accumulated byte count  502          │
└─────────────────────────────────────────────┘
                       │
┌─────────────────────────────────────────────┐
│  apply an iterative vector encoding method to  │
│    generate an encoded bit vector 504          │
└─────────────────────────────────────────────┘
                       │
┌─────────────────────────────────────────────┐
│  store the encoded bit vector in an operational │
│         statistics map 506                      │
└─────────────────────────────────────────────┘
```

FIG. 5

OPERATIONAL STATISTICS ENCODING AND MAPPING IN NETWORK NODES

CROSS REFERENCE TO RELATED APPLICATIONS

This application claims priority to U.S. Provisional Application No. 63/441,692 filed Jan. 27, 2023, the contents of which are incorporated herein by reference.

TECHNICAL FIELD

Embodiments relate generally to computer network communications, and, more specifically, to operational statistics encoding and mapping in network nodes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

More and more computing applications supported by these networks are latency sensitive and tend to access or generate relatively large amounts of data in relatively short time periods. Highly time varying load conditions are occurring more and more frequently in computer networks. Time durations for many individual load conditions are expected to decrease for many computing applications moving forward.

Solutions under existing approaches have limited ability to timely collect relevant data/statistics related to these individual load conditions. These solutions tend to miss specific load conditions of relatively short durations or generate inaccurate or incomplete information about these load conditions.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 2D illustrates an example iterative vector encoding process flow;

FIG. 5 illustrates an example process flow; and

DETAILED DESCRIPTION

Figure 1:
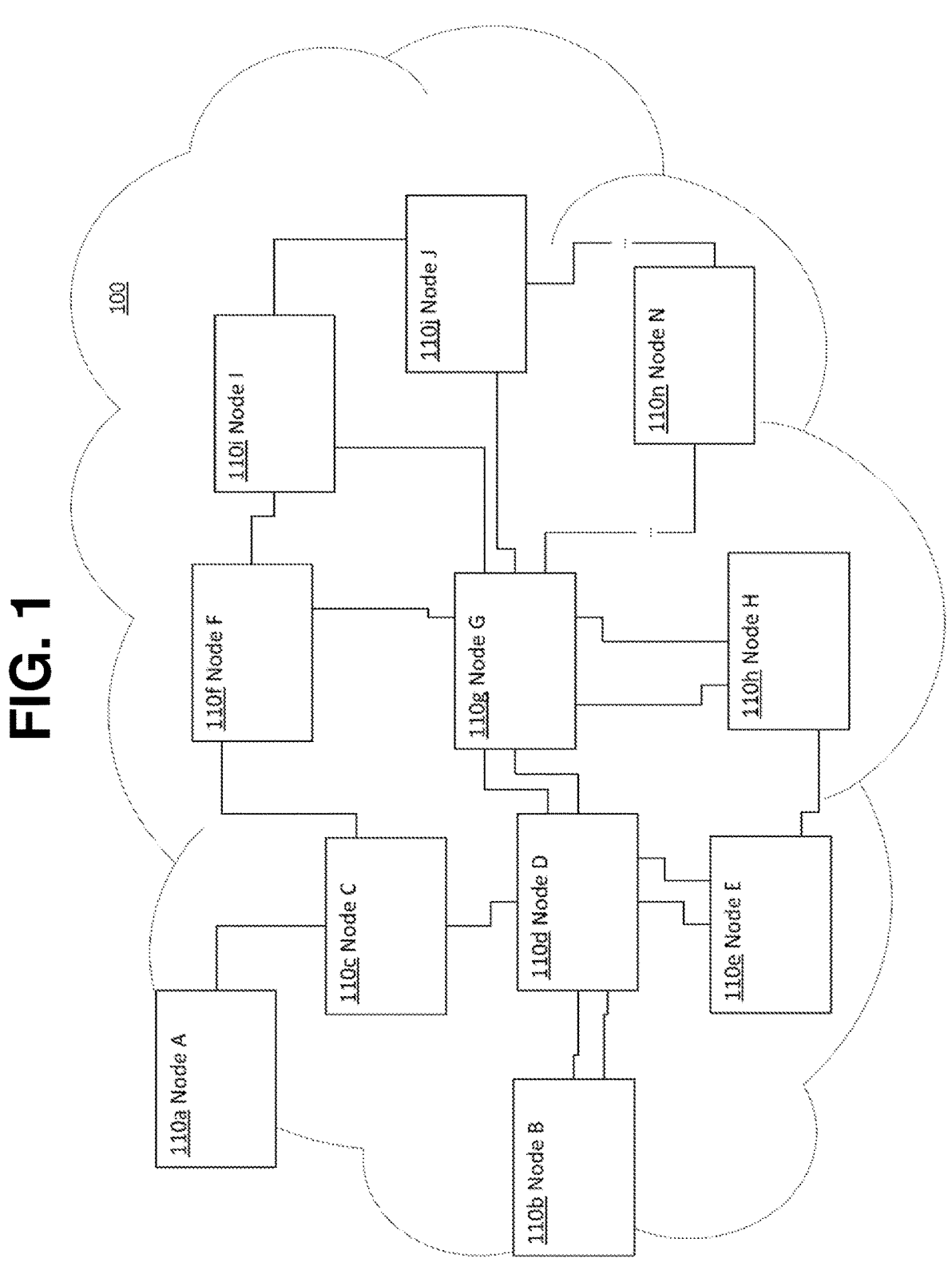
FIG. 1 illustrates an example networking system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0 General Overview
2.0. Structural Overview
    2.1. Data Units
    2.2. Network Paths
    2.3. Network Device
    2.4. Ports
    2.5. Packet Processors
    2.6. Buffers
    2.7. Queues
    2.8. Traffic Management
    2.9. Forwarding Logic
    2.10. Encoded Vector Generator
    2.11. Statistics Mapper
    2.12. Miscellaneous
3.0. Functional Overview
    3.1. Port Attributes
    3.2. Operational Statistics
    3.3 Encoded Vectors
    3.4. Iterative Encoding
    3.5. Statistics Mapping
    3.6. Congestion Control
    3.7. Traffic Engineering
    3.8. Capacity Constraints
    3.9. Monitoring Framework
4.0. Example Embodiments
5.0. Implementation Mechanism—Hardware Overview
6.0. Extensions and Alternatives

1.0. GENERAL OVERVIEW

Techniques as described herein can be implemented to timely, accurately and comprehensively monitor different individual load conditions and generate relevant operational statistics including but not limited to available and/or used bandwidths under these different load conditions with relatively high precision or fidelity and low latency.

Under these techniques, sampling may be performed at a relatively low resource and computational cost by each of one or more network nodes or switching devices of a computer network to periodically generate samples of operational statistics of each of some or all packet processing components of the network nodes while each of these packet processing components is contemporaneously receiving, processing or transmitting packets. Example packet processing components may include, but are not necessarily limited to only, ingress and/or egress ports and associated queues, buffers, switching fabrics and traffic managers, etc. Example operational statistics may include, but are not necessarily limited to only, those related to one or more of: instantaneous and/or average port utilization/loading, instantaneous and/or average available bandwidths, instantaneous and/or average port or data rates, etc.

Operational statistics such as those collected from ingress and/or egress ports of a network node can be iteratively encoded into bit vectors with relatively high precision. These encoded vectors can be readily accessed and processed, and further mapped to generate mapped operational statistics relating to utilization, used and available rates, used and available bandwidths of packet processing components in the network node such as the above-mentioned ingress and/or egress ports.

Metrics of different types, different formats and/or different precisions can be further generated from the mapped or encoded operational statistics, for example depending on specific implementations and operations of recipient devices for these metrics.

Operational statistics and/or metrics as described herein may be provided—e.g., through network data communication interfaces, streaming interfaces, or (e.g., PCIe, CXL, etc.) communication links—by one or more network nodes or switching devices as described herein to other computing devices such as upstream network nodes, downstream network nodes, external devices or host computing devices. Recipient devices can use these operational statistics and/or metrics, along with capacity constraints of resources in the network nodes to perform some or all of a wide variety of network or element management and control operations including but not limited to congestion management operations, traffic engineering operations, performance management operations, and so on.

Relatively close monitoring and corresponding proactive measures may be taken to deal with different load conditions and resource issues and reduce latency for a variety of computing applications supported by the computer network or the network nodes therein. In some operational scenarios, previously undetected problems may be discovered relatively timely or at the first opportunity and dealt with promptly under techniques as described herein. Network operations, algorithms, capacities and/or traffic loads may be proactively or timely adjusted, balanced and/or optimized to avoid or ameliorate underlying network problems related to the different load conditions.

In some operational scenarios, the capacity constraints, operational statistics and/or metrics can be used in real time packet forwarding operations—including but not limited to packet receiving, processing and/or transmitting operations—of one or more network nodes or switching devices of a computer network. For example, different (e.g., TCP based, non-TCP based, standard-based, proprietary, standards enhanced by proprietary specifications, etc.) explicit congestion operations may be specifically selected or performed by a network or network nodes as described herein in real time packet processing operations based at least in part on the capacity constraints, operational statistics and/or metrics.

Approaches, techniques, and mechanisms are disclosed for encoding and mapping network operational statistics. A pre-scaled accumulated byte count of a port of a network node over a sampling period is scaled with a scaling factor to generate a scaled accumulated byte count. The pre-scaled accumulated byte count represents a total number of bytes in packets transferred by the port of a network node. The scaling factor represents a first port-specific attribute of the port and scales a port-specific maximum throughput of the port to a specific maximum port throughput of the network node. An iterative vector encoding method is applied to the scaled accumulated byte count to generate an encoded bit vector comprising a plurality of bits respectively in a plurality of ordered bit positions. Each set bit of the encoded bit vector represents a respective weighted value of port utilization of the port. The encoded bit vector is stored, at a map location at least in part determined by a map offset associated with the port, in an operational statistics map.

In other aspects, the inventive subject matter encompasses computer apparatuses and/or computer-readable media configured to carry out the foregoing techniques.

2.0. STRUCTURAL OVERVIEW

FIG. 1 illustrates example aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g., a TCP segment, etc.) to a second node 110 over a path that includes an intermediate node 110. This unit of data may be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g., frames and/or cells, etc.) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node 110 belongs). The forwarding instructions may indicate, for instance, an outgoing port over which to send the unit of data, a label to attach the unit of data, etc. In cases where multiple paths (e.g., over the same port, over different ports, etc.) to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g., a "five-tuple" combination of a source address, source port, destination address, destination port, and protocol, etc.). A flow is often intended to be sent in sequence, and network devices are therefore typically configured to send all data units within a given flow along a same path to ensure that the flow is received in sequence.

A node 110 may operate on network data at several different layers, and therefore view the same data as belonging to several different types of data units.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g., which egress port it should send the data unit out on, etc.). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2A:
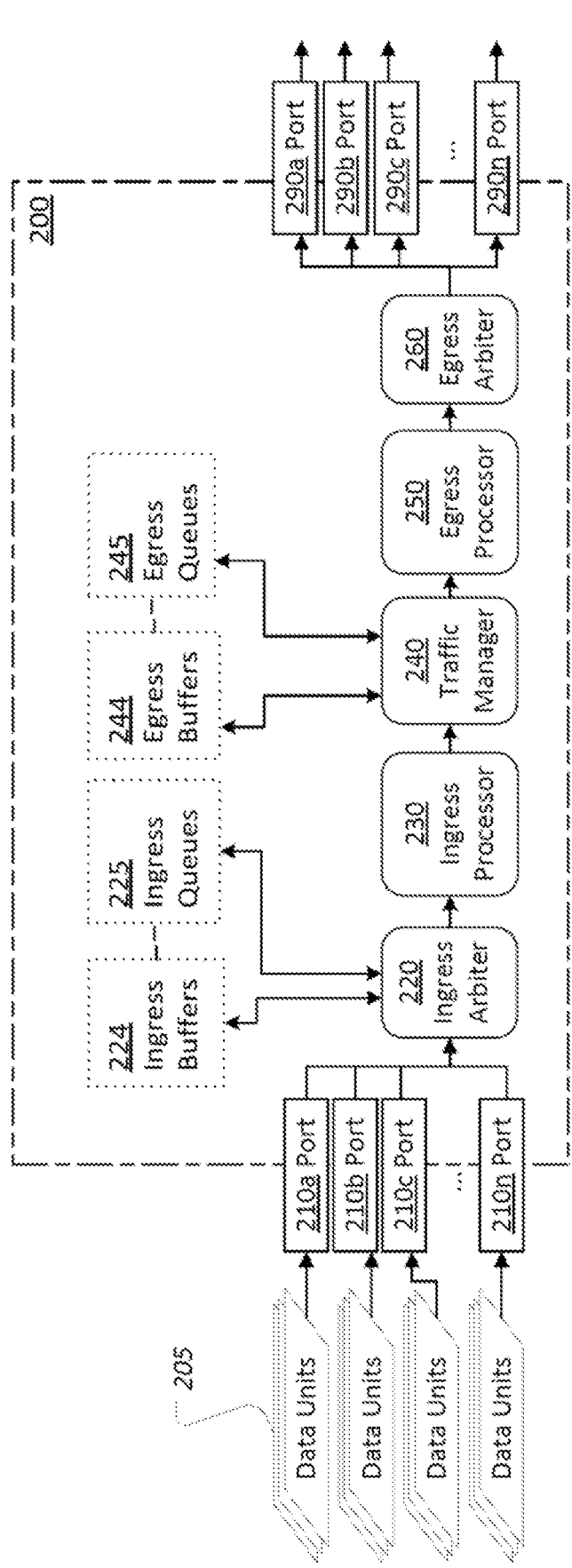
FIG. 2A illustrates an example network device.

FIG. 2A illustrates example aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FP-GAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205—e.g., originated from a first end user computing device other than the nodes of the network 100 and destined to a second different end user computing device other than the nodes of the network 100—through various subcomponents of the forwarding logic of device 200 is as follows. After being received via a port 210, a data unit 205 may be buffered in an ingress buffer 224 and queued in an ingress queue 225 by an ingress arbiter 220 until the data unit 205 can be processed by an ingress packet processor 230, and then delivered to an interconnect (or a cross connect) such as a switching fabric. From the interconnect, the data unit 205 may be forwarded to a traffic manager 240. The traffic manager 240 may store the data unit 205 in an egress buffer 244 and assign the data unit 205 to an egress queue 245. The traffic manager 240 manages the flow of the data unit 205 through the egress queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter 260 which temporally stores or buffers the data unit 205 in a transmit buffer and finally forwards out the data unit via another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210-1 through 210-N, are inbound ("ingress") ports by which data units referred to herein as data units 205 are received over a network, such as network 110. Ports 290, including ports 290-1 through 290-N, are outbound ("egress") ports by which at least some of the data units 205 are sent out to other destinations within the network, after having been processed by the network device 200.

Egress ports 290 may operate with corresponding transmit buffers to store data units or subunits (e.g., packets, cells, frames, transmission units, etc.) divided therefrom that are to be transmitted through ports 290. Transmit buffers may have one-to-one correspondence relationships with ports 290, many-to-one correspondence with ports 290, and so on. Egress processors 250 or egress arbiters 260 operating with egress processors 250 may output these data units or subunits to transmit buffers before these units/subunits are transmitted out from ports 290.

Data units 205 may be of any suitable PDU type, such as packets, cells, frames, transmission units, etc. In an embodiment, data units 205 are packets. However, the individual atomic data units upon which the depicted components may operate may actually be subunits of the data units 205. For example, data units 205 may be received, acted upon, and transmitted at a cell or frame level. These cells or frames may be logically linked together as the data units 205 (e.g., packets, etc.) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes but may actually correspond to the same physical hardware ports (e.g., network jacks or interfaces, etc.) on the network device 210. That is, a network device 200 may both receive data units 205 and send data units 205 over a single physical port, and the single physical port may thus function as both an ingress port 210 (e.g., one of 210a, 210b, 210c, ... 210n, etc.) and egress port 290. Nonetheless, for various functional purposes, certain logic of the network device 200 may view a single physical port as a separate ingress port 210 and a separate egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in some operational scenarios, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 230. On the other end, an egress packet processor 250 may input data units serially into another SerDes block, which outputs the data units in parallel to ports 290.

2.5. Packet Processors

A device 200 comprises one or more packet processing components that collectively implement forwarding logic by which the device 200 is configured to determine how to handle each data unit 205 that the device 200 receives. These packet processors components may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 230 and 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 230 and 250 configured to perform any number of processing tasks.

In an embodiment, the packet processors 230 and 250 within a device 200 may be arranged such that the output of one packet processor 230 or 250 may, eventually, be inputted into another packet processor 230 or 250, in such a manner as to pass data units 205 from certain packet processor(s) 230 and/or 250 to other packet processor(s) 230 and/or 250 in a sequence of stages, until finally disposing of the data units 205 (e.g., by sending the data units 205 out an egress port 290, "dropping" the data units 205, etc.). The exact set and/or sequence of packet processors 230 and/or 250 that process a given data unit 205 may vary, in some embodiments, depending on the attributes of the data unit 205 and/or the state of the device 200. There is no limit to the number of packet processors 230 and/or 250 that may be chained together in such a manner.

Based on decisions made while processing a data unit 205, a packet processor 230 or 250 may, in some embodiments, and/or for certain processing tasks, manipulate a data unit 205 directly. For instance, the packet processor 230 or 250 may add, delete, or modify information in a data unit header or payload. In other embodiments, and/or for other processing tasks, a packet processor 230 or 250 may generate control information that accompanies the data unit 205, or is merged with the data unit 205, as the data unit 205 continues through the device 200. This control information may then be utilized by other components of the device 200 to implement decisions made by the packet processor 230 or 250.

In an embodiment, a packet processor 230 or 250 need not necessarily process an entire data unit 205, but may rather only receive and process a subunit of a data unit 205 comprising header information for the data unit. For instance, if the data unit 205 is a packet comprising multiple cells, the first cell, or a first subset of cells, might be forwarded to a packet processor 230 or 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 230 or an egress packet processor 250. Generally, an ingress processor 230 resolves destinations for a traffic manager 240 to determine which egress ports 290 (e.g., one of 290a, 290b, 290c ... 290n, etc.) and/or queues a data unit 205 should depart from. There may be any number of ingress processors 230, including just a single ingress processor 230.

In an embodiment, an ingress processor 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 230 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 or corresponding transmit buffers for the ports 290 may be regulated via an egress arbiter 260 coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by component(s) such as the packet processor(s) 230 and/or 250 and/or ports 290 at the same time, various components of device 200 may temporarily store data units 205 in memory structures referred to as (e.g., ingress, egress, etc.) buffers while the data units 205 are waiting to be processed. For example, a certain packet processor 230 or 250 or port 290 may only be capable of processing a certain amount of data such as a certain number of data units 205, or portions of data units 205, in a given clock cycle, meaning that other data units 205, or portions of data units 205, destined for the packet processor 230 or 250 or port 290 must either be ignored (e.g., dropped, etc.) or stored. At any given time, a large number of data units 205 may be stored in the buffers of the device 200, depending on network traffic conditions.

A device 200 may include a variety of buffers, each utilized for varying purposes and/or components. Generally, a data unit 205 awaiting processing by a component is held in a buffer associated with that component until the data unit 205 is "released" to the component for processing.

Buffers may be implemented using any number of distinct banks of memory. Each bank may be a portion of any type of memory, including volatile memory and/or non-volatile memory. In an embodiment, each bank comprises many addressable "entries" (e.g., rows, columns, etc.) in which data units 205, subunits, linking data, or other types of data, may be stored. The size of each entry in a given bank is known as the "width" of the bank, while the number of entries in the bank is known as the "depth" of the bank. The number of banks may vary depending on the embodiment.

Each bank may have associated access limitations. For instance, a bank may be implemented using single-ported memories that may only be accessed once in a given time slot (e.g., clock cycle, etc.). Hence, the device 200 may be configured to ensure that no more than one entry need be read from or written to the bank in a given time slot. A bank may instead be implemented in a multi-ported memory to support two or more accesses in a given time slot. However, single-ported memories may be desirable in many cases for higher operating frequencies and/or reducing costs.

In an embodiment, in addition to buffer banks, a device may be configured to aggregate certain banks together into logical banks that support additional reads or writes in a time slot and/or higher write bandwidth. In an embodiment, each bank, whether logical or physical or of another (e.g., addressable, hierarchical, multi-level, sub bank, etc.) organization structure, is capable of being accessed concurrently with each other bank in a same clock cycle, though full realization of this capability is not necessary.

Some or all of the components in device 200 that utilize one or more buffers may include a buffer manager configured to manage use of those buffer(s). Among other processing tasks, the buffer manager may, for example, maintain a mapping of data units 205 to buffer entries in which data for those data units 205 is stored, determine when a data unit 205 must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit 205 is received as, or divided into, constituent data unit portions for storage purposes. The buffers may store these constituent portions separately (e.g., not at the same address location or even within the same bank, etc.). The one or more buffer entries in which a data unit 205 are stored are marked as utilized (e.g., in a "free" list, free or available if not marked as utilized, etc.) to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to banks and/or specific entries within those banks randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different banks may be utilized to store data units 205 received from different ports 210 or sets of ports 210. In an embodiment, the buffer assignment logic also or instead utilizes buffer state information, such as utilization metrics, to determine which bank and/or buffer entry to assign to a data unit 205, or portion thereof. Other assignment considerations may include buffer assignment rules (e.g., no writing two consecutive cells from the same packet to the same bank, etc.) and I/O scheduling conflicts, for example, to avoid assigning a data unit to a bank when there are no available write operations to that bank on account of other components reading content already in the bank.

2.7. Queues

In an embodiment, to manage the order in which data units 205 are processed from the buffers, various components of a device 200 may implement queueing logic. For example, the flow of data units through ingress buffers 224 may be managed using ingress queues 225 while the flow of data units through egress buffers 244 may be managed using egress queues 245.

Each data unit 205, or the buffer locations(s) in which the data unit 205 is stored, is said to belong to one or more constructs referred to as queues. Typically, a queue is a set of memory locations (e.g., in the buffers 224 and/or 244, etc.) arranged in some order by metadata describing the queue. The memory locations may (and often are) non-contiguous relative to their addressing scheme and/or physical or logical arrangement. For example, the metadata for one queue may indicate that the queue is comprised of, in order, entry addresses 2, 50, 3, and 82 in a certain buffer.

In many embodiments, the sequence in which the queue arranges its constituent data units 205 generally corresponds to the order in which the data units 205 or data unit portions in the queue will be released and processed. Such queues are known as first-in-first-out ("FIFO") queues, though in other embodiments other types of queues may be utilized. In some embodiments, the number of data units 205 or data unit portions assigned to a given queue at a given time may be limited, either globally or on a per-queue basis, and this limit may change over time.

2.8. Traffic Management

According to an embodiment, a device 200 further includes one or more traffic managers 240 configured to control the flow of data units to one or more packet processor(s) 230 and/or 250. For instance, a buffer manager within the traffic manager 240 may temporarily store data units 205 in buffers 244 as they await processing by egress processor(s) 250. A traffic manager 240 may receive data units 205 directly from a port 210, from an ingress processor 230, and/or other suitable components of device 200. In an embodiment, the traffic manager 240 receives one TDU from each possible source (e.g. each port 210, etc.) each clock cycle or other time slot.

Traffic manager 240 may include or be coupled to egress buffers 244 for buffering data units 205 prior to sending those data units 205 to their respective egress processor(s) 250. A buffer manager within the traffic manager 240 may temporarily store data units 205 in egress buffers 244 as they await processing by egress processor(s) 250. The number of egress buffers 244 may vary depending on the embodiment. A data unit 205 or data unit portion in an egress buffer 244 may eventually be "released" to one or more egress processor(s) 250 for processing, by reading the data unit 205 from the (e.g., egress, etc.) buffer 244 and sending the data unit 205 to the egress processor(s) 250. In an embodiment, traffic manager 240 may release up to a certain number of data units 205 from buffers 244 to egress processors 250 each clock cycle or other defined time slot.

Beyond managing the use of buffers 244 to store data units 205 (or copies thereof), a traffic manager 240 may include queue management logic configured to assign buffer entries to queues and manage the flow of data units 205 through the queues. The traffic manager 240 may, for instance, identify a specific queue to assign a data unit 205 to upon receipt of the data unit 205. The traffic manager 240 may further determine when to release—also referred to as "dequeuing"—data units 205 (or portions thereof) from queues and provide those data units 205 to specific packet processor(s) 250. Buffer management logic in the traffic manager 240 may further "deallocate" entries in a buffer 244 that store data units 205 are no longer linked to the traffic manager's queues. These entries are then reclaimed for use in storing new data through a garbage collection process.

In an embodiment, different queues may exist for different destinations. For example, each port 210 and/or port 290 may have its own set of queues. The queue to which an incoming data unit 205 is assigned and linked may, for instance, be selected based on forwarding information indicating which port 290 the data unit 205 should depart from. In an embodiment, a different egress processor 250 may be associated with each different set of one or more queues. In an embodiment, the current processing context of the data unit 205 may be used to select which queue a data unit 205 should be assigned to.

In an embodiment, there may also or instead be different queues for different flows or sets of flows. That is, each identifiable traffic flow or group of traffic flows is assigned its own set of queues to which its data units 205 are respectively assigned. In an embodiment, different queues may correspond to different classes of traffic or quality-of-service (QOS) levels. Different queues may also or instead exist for any other suitable distinguishing properties of the data units 205, such as source address, destination address, packet type, and so forth.

Device 200 may comprise any number (e.g., one or more, etc.) of packet processors 230 and/or 250 and traffic managers 240. For instance, different sets of ports 210 and/or ports 290 may have their own traffic manager 240 and packet processors 230 and/or 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 230 or 250 for any number of intermediate stages. The data unit 205 may thus pass through any number of traffic managers 240 and/or packet processors 230 and/or 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 230, such that data units 205 (or portions thereof) are assigned to buffers only upon being initially processed by an ingress packet processor 230. Once in an egress buffer 244, a data unit 205 (or portion thereof) may be "released" to one or more egress packet processor(s) 250 for processing, either by the traffic manager 240 sending a link or other suitable addressing information for the corresponding buffer 244 to the egress packet processor 250, or by sending the data unit 205 directly.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues for each of ports 1, 3, and 5. As another example, a data unit 205 may be replicated a number of times after it reaches the head of a queue (e.g., for different egress processors 250, etc.). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual copy of the data unit 205 in buffers, or a single copy of the data unit 205 may be linked from a single buffer location to multiple queues at the same time.

2.9. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 230 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 230 performs edits as well.

The forwarding logic may be hard-coded and/or configurable, depending on the embodiment. For example, the forwarding logic of a device 200, or portions thereof, may, in some instances, be at least partially hard-coded into one or more ingress processors 230 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g., are directed to, etc.) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g., utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers are overutilized, a queue is over a certain size, and/or a data unit 205 has a certain characteristic.

2.10. Encoded Vector Generator

Figure 2C:
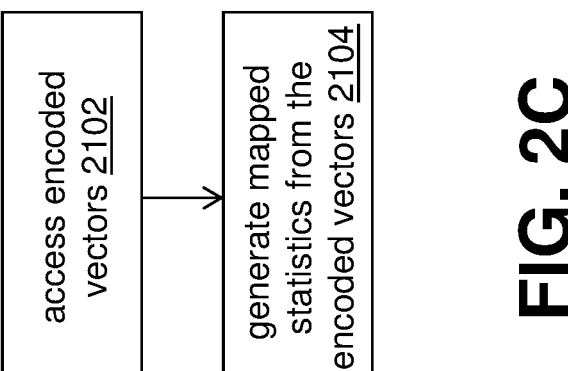
FIG. 2C illustrates an example process flow performed by an operational statistics mapper.
Figure 2B:
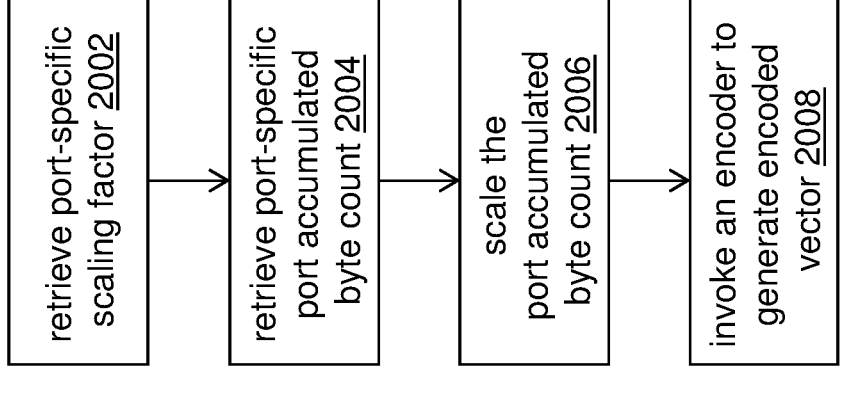
FIG. 2B illustrates an example process flow performed by an operational statistics and encoded vector generator.

FIG. 2B illustrates an example process flow performed by an operational statistics and encoded vector generator (or generation logic), which processes raw operational statistics of packet processing components of a network node (e.g., a networking or packet switch device, etc.) as input to generate encoded vectors for the packet processing components as output. The encoded vectors may be maintained, stored, cached, looked up and/or accessed in an operational statistics map of the network node. For the purpose of illustration only, the packet processing components are described as—or represent—a plurality of ports in the network node such as ingress and/or egress ports of the network node. However, it should be noted that, in other operational scenarios, some or all techniques as described herein may be implemented or used to process raw operational statistics and generate one or more operational statistics maps of other types of packet processing components in addition to or in place of the plurality of ports in the network node.

Some or all of these operations of FIG. 2B can be in part or in whole implemented or performed by the network node or hardware and/or software attendant to the packet processing components in the network node. Each of these operations may be collectively or individually implemented with one or more computing devices that comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

As illustrated in FIG. 2B, in block 2002, the operational statistics and encoded vector generator retrieves or determines, for each individual port in the ports, a corresponding port-specific scaling factor among one or more corresponding port attributes for the same individual port from a first data store (storing port attributes). The corresponding port identifier ("port_id", which may refer to an identifier of an ingress port or an egress port) for the individual port may be used to look up in a respective entry in the first data store for the corresponding port-specific scaling factor among the one or more individual port attributes of the individual port.

In block 2004, a corresponding port identifier (denoted as "port_id") for the individual port may be used by the operational statistics and encoded vector generator to access a port-specific entry or instance in a second data store (storing port accumulated bytes) to retrieve or determine the corresponding pre-scaled or actual port accumulated byte count (or bytes) for the individual port.

In block 2006, the operational statistics and encoded vector generator uses the port-specific scaling factor for the individual port to apply a scaling operation (e.g., multiplication in a linear domain, addition in a logarithmic domain, bit shifting, etc.) to the pre-scaled or actual port accumulated byte count (or bytes) for the individual port to generate a scaled port accumulated byte count (or bytes) for the individual port.

In block 2008, the operational statistics and encoded vector generator invokes or operate with an iterative vector encoder iterate over N rounds to produce or generate an N-bit encoded vector (e.g., N=10, N=11, N=12, etc.) from an input quantity. By way of example but not limitation, the initial input quantity to the iterative vector may be a scaled port accumulated byte count as described herein for an individual port of the network node over a sampling period.

The iterative vector encoder can be implemented or used to apply or execute an iterative encoding algorithm or process flow to construct the N-bit encoded vector (or simply bit vector) from the input quantity, starting with the most significant bit (msb) of the bit vector and ending with the least significant bit (lsb) of the bit vector. Each set bit in the N-bit vector represents a weighted value or a weight assigned or corresponding to a respective bit position of the set bit.

The sum of weighted values represented by all set bits in their respective bit positions in the vector may be divided by a value range or the largest possible sum of weighted value representable by—e.g., all N bits are set bits—N bits of an N-bit encoded vector to generate a relative value of the input quantity received by the iterative vector encoder.

As a result, a plurality of N-bit vectors (or encoded values) for the plurality of ports generated for a given sampling period—e.g., each of one or more sampling periods, etc.—may be maintained, stored, cached, looked up and/or accessed in an (operational) statistics map at map locations respectively specified or referenced in part or in whole by a plurality of map offsets.

2.11. Statistics Mapper

FIG. 2C illustrates an example process flow implemented or performed by an operational statistics mapper (or mapping logic), which extracts encoded vectors from an (input) statistics map as input and generate mapped statistics or values from the extracted encoded vectors as output. The extracted encoded vectors represent encoded raw and/or processed operational statistics of packet processing components of a network node (e.g., a networking or packet switch device, etc.), whereas the mapped statistics or values generated from the encoded vectors represent output operational statistics of the packet processing components. In some operational scenarios, the mapped or output operational statistics may be stored or cached in an output statistics map of the network node. Additionally, optionally or alternatively, some or all of the mapped or output operational statistics may be outputted as in-band telemetry data of the packet processing components in network/data packets forwarded by the network node to other network nodes or external processors/systems, in place of or in addition to the output statistics map. For the purpose of illustration only, the packet processing components are represented as a plurality of ports in the network node as described herein such as ingress and/or egress ports of the network node. However, it should be noted that, in other operational scenarios, some or all techniques as described herein may be used to extract encoded vectors from a statistics map as described herein representing operational statistics of other types of packet processing components in addition to or in place of the plurality of ports in the network node and generate mapped or output operational statistics from the extracted encoded vectors of these other types of packet processing components.

In some operational scenarios, some or all of these operations of FIG. 2C may be in part or in whole implemented or performed by the network node or hardware and/or software attendant to the packet processing components. Each of these operations may be collectively or individually implemented with one or more computing devices that comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

For the purpose of illustration only, the input statistics map—which is generated by the process flow of FIG. 2B as output and received by the process flow of FIG. 2C as input—includes a plurality of profiles (or sets) of encoded vectors for a plurality of ports in the network node. As noted, some or all techniques as described herein can be applied to other types of packet processing components in addition to or in place of the ports.

Each profile of encoded vectors in the plurality of profiles of encoded vectors may represent a respective profile (or a respective set) of encoded vectors (e.g., N-bit encoded vectors, etc.) generated for a respective port in the plurality of ports for one or more (e.g., last, most recent, current, etc.) sampling periods.

In block 2102 of FIG. 2C, a data extractor of the operational statistics mapper accesses each profile or set of encoded vectors—generated for the one or more sampling period for a respective port among the plurality of ports—among the plurality of profiles or sets of encoded vectors from the operational statistics map. A map location of the operational statistics map at which the profile or set of encoded vectors is located or accessed by the data extractor may be determined, deduced, inferred, and/or correlated to the port, at least in part based on a corresponding map offset assigned to the port. The profile or set of encoded vectors for the port includes one or more encoded vectors generated for the port for the one or more sampling periods. For example, the profile or set of encoded vectors for the port may include an encoded vector—e.g., representing a port utilization or loading of the port—for each of the one or more sampling periods.

In block 2104, the operational statistics mapper, or the data extractor therein, uses the one or more encoded vectors in the profile or set of encoded vectors for the port, as extracted from the operational statistics map, to generate mapped statistics (e.g., encoded values in a bit array, etc.) for the port.

The mapped statistics generated from the one or more encoded vectors in the profile or set of encoded vectors for the port may be maintained, stored, cached or accessed in the output statistics map as a bit array of a specific number M (e.g., M=24, M=30, M=40, etc.) of bits encoded with mapped operational statistics for the port. In some operational scenarios, some or all bit arrays encoded with mapped operational statistics of some or all ports may be maintained, stored, cached, referenced or accessed in the output statistics map without padding bits or bytes inserting in between any two neighboring bit arrays in the output statistics map. Additionally, optionally or alternatively, some or all of the mapped statistics for the port may be outputted as in-band telemetry data in network/data packets forwarded by the port to other packet processing components, host processors, other network nodes or external processors/systems, in place of or in addition to the bit array in the output statistics map.

2.12. Miscellaneous

Device 200 of FIG. 2A illustrates only examples of many possible arrangements of devices configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100 or a network topology 150.

Furthermore, figures herein illustrate but a few of the various arrangements of memories that may be utilized to implement the described buffering techniques. Other arrangements may include fewer or additional elements in varying arrangements.

3.0. FUNCTIONAL OVERVIEW

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in one or more devices 600 that utilize some or all of the time sensitive communication mechanisms described herein. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Port Attributes

Individual or port-specific attributes (or properties) of packet processing components—for the purpose of illustration only, a plurality of (ingress and/or egress) ports—may be configured, stored or maintained in a first data store or construct comprising a plurality of entries. Some or all of these attributes may be relatively static, for example, stable or unchanged through one or more consecutive sampling periods in a plurality of sampling periods. Examples of a sampling period as described herein may include, but are not necessarily limited to only, any of: an inverse of a corresponding sampling frequency, a specific number of clock cycles, one or more sub-nano seconds, one or more nano-seconds, one or more tens of nano-seconds, one or more hundreds of nano-seconds, one or more micro-seconds, one or more tens of micro-seconds, etc. In various operational scenarios, two different ports in the plurality of ports may be configured with the same sampling period, or with two different sampling periods. A sampling period configured for the entire network node or for a subset of packet processing component therein may be set to a system default value or a user configurable value.

Each entry in the plurality of entries in the first data store ("port attributes") may correspond to, or may be associated with, a respective port in the plurality of ports in the network node and may store or maintain one or more corresponding individual port attributes of the respective port. Each individual port in the plurality of ports as represented in the plurality of entries in the first data store may be distinguished in part or in whole by a corresponding port identifier ("port_id") in a plurality of distinct port identifiers. For example, the corresponding port identifier of the individual port may be used as a lookup key to locate a corresponding entry, associated with the individual port, in the plurality of entries in the first data store ("port attributes"). This corresponding entry may be used to provide some or all port attributes or properties of the individual port.

3.2. Operational Statistics

Raw operational statistics used to generate the operational statistics map may be collected, maintained and/or accessed through a second data store or construct in real time or in near real time. The raw operational statistics may represent data samples that are relatively dynamic—such as time-variant measurements for each different sampling period in the plurality of sampling periods. For the purpose of illustration only, the second data store includes a plurality of entries or instances (e.g., byte counters, etc.) that maintain these data samples.

By way of example but not limitation, these data samples in the second data store include a plurality of pre-scaled or actual port accumulated byte counts or (bytes) per sampling period—as the raw operational statistics—for the plurality of ports in the network node.

Each entry or instance in the plurality of entries or instances in the second data store ("port accumulated bytes") indicates a respective pre-scaled or actual accumulated byte count (or bytes) corresponding to an individual (or port-specific) total number of bytes transferred (e.g., received and/or transmitted, etc.) through a respective port per-sampling-period for a current sampling period, for the last collected sampling period, etc. In some operational scenarios, inter-packet gaps (IPGs) may be added or included as a part of the respective pre-scaled or actual accumulated byte count (or bytes) to account for inserting bit or byte gaps preceding or succeeding network packets processed through the respective port during the sampling period. An inter-packet gap as described herein may be configured or determined—e.g., looked up in the first data store ("port attributes") or the like using the corresponding port identifier ("port_id") of the respective port—as a port attribute of the respective port.

As noted, the operational statistics and encoded vector generator can perform a statistics scaling operation, which uses port-specific scaling factors to normalize or scale individual pre-scaled or actual accumulated byte counts for some or all of the ports to corresponding scaled quantities in reference to the maximum speed or throughput port among these ports.

By way of illustration but not limitation, among the plurality of ports in the network node, the port(s) with the maximum speed or throughput may be 800G bytes/second port(s). Hence, a first scaling factor for a first port with a first speed or throughput of 100G bytes/second in the plurality of ports of the network node may be configured or set to be 8, which represents the ratio of 800G of the (reference) port(s) over 100G of the first port. This first scaling factor may be a port attribute of the first port—e.g., looked up using a first port identifier of the first port—from the first data store ("port attributes"). The first scaling factor may be used to normalize or scale—e.g., to apply a bit shift operations to—a data sample of the first port such as a pre-scaled or actual accumulated byte count of the first port during a sampling period to a corresponding scaled quantity in reference to the 800G bytes/second port, which is the maximum speed or throughput port of the network node.

Likewise, a second scaling factor for a second port with a second speed or throughput of 400G bytes/second in the plurality of ports of the network node may be configured or set to be 2, which represents the ratio of 800G of the (reference) port(s) over 400G of the second port. This second scaling factor may be a port attribute of the second port—e.g., looked up using a second port identifier of the second port—from the first data store ("port attributes"). The second scaling factor may be used to normalize or scale—e.g., to apply a bit shift operations to—a data sample of the second port such as a pre-scaled or actual accumulated byte count of the second port during a sampling period to a corresponding scaled quantity in reference to the 800G bytes/second port, which is the maximum speed or throughput port of the network node.

As shown in FIG. 2B, the operational statistics and encoded vector generator performs a statistics scaling operation, which retrieves, receives or accepts, for each individual port in the plurality of ports, inputs that include a corresponding pre-scaled or actual port accumulated byte count (or bytes) for the individual port from the second data store and a corresponding port-specific scaling factor among one or more corresponding port attributes for the same individual port from the first data store. More specifically, a corresponding port identifier ("port_id") for the individual port may be used to access a port-specific entry or instance in the second data store to retrieve or determine the corresponding pre-scaled or actual port accumulated byte count (or bytes) for the individual port. The corresponding port identifier ("port_id") for the individual port may be used to look up in a respective entry in the first data store for the corresponding port-specific scaling factor among the one or more individual port attributes of the individual port.

The statistics scaling operation uses the port-specific scaling factor for the individual port to apply a scaling operation (e.g., multiplication in a linear domain, addition in a logarithmic domain, bit shifting, etc.) to the pre-scaled or actual port accumulated byte count (or bytes) for the individual port to generate a scaled port accumulated byte count (or bytes) for the individual port.

3.3. Encoded Vectors

As noted, the iterative vector encoder operates or iterates over N rounds to produce or generate an N-bit encoded vector (e.g., N=10, N=11, N=12, etc.) from an input quantity such as a scaled port accumulated byte count for an individual port of the network node over a sampling period. The iterative vector encoder can apply or execute an iterative encoding algorithm or process flow to construct the N-bit encoded vector (or simply bit vector) from the input quantity, starting with the most significant bit (msb) of the bit vector and ending with the least significant bit (lsb) of the bit vector. Each set bit in the N-bit vector represents a weighted value or a weight assigned or corresponding to a respective bit position of the set bit.

The sum of weighted values represented by all set bits in their respective bit positions in the vector may be divided by a value range or the largest possible sum of weighted value representable by—e.g., all N bits are set bits—N bits of an N-bit encoded vector to generate a relative value of the input quantity received by the iterative vector encoder.

In the present example, the input quantity to the iterative vector encodes is the scaled accumulated byte count of the individual port over the sampling period. The relative value of the input quantity may be generated by dividing the sum of the weighted values of all the set bits of the N-bit encoded vector by the value range or the largest possible sum of weighted value of N bits of an N-bit encoded vector. This relative value of the input quantity derived from the scaled accumulated byte count represents a port utilization (or loading) value of the individual port in the sampling period.

Figure 3:
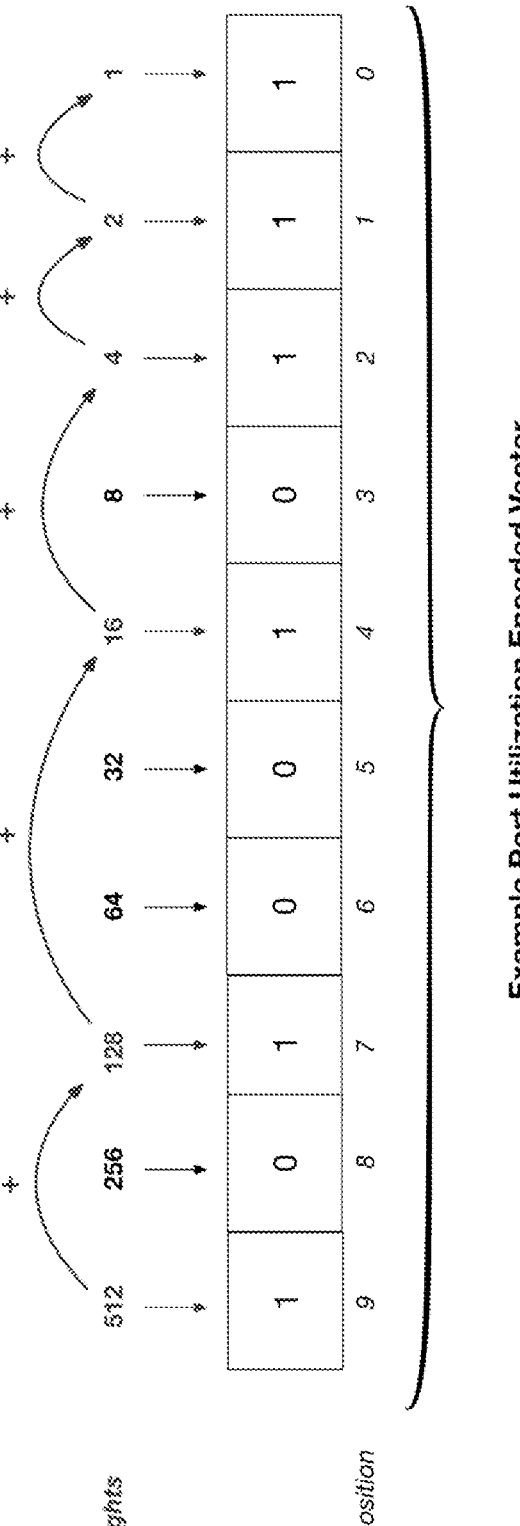
FIG. 3 illustrates an example encoded vector.

FIG. 3 illustrates an example N-bit encoded vector, where N is ten (10). The vector may be generated by the iterative vector encoder from an input quantity or an input operational statistic such as a scaled port accumulated byte count of an individual port over a sampling period and used to generate or compute a port utilization (percentile value) of the individual port in the sampling period as follows.

Each bit position in the N-bit vector may be assigned a corresponding weight or weighted value. As illustrated in FIG. 3, these bit positions from the 9-th bit position (msb) to the 0-th bit position (lsb) may respectively assigned a corresponding weight or weighted value from 512 for the msb (9-th bit position) to 1 for the lsb (0-th bit position). Hence, the sum of weighted values of all set bits in the N-bit encoded vector of FIG. 3 equals $512+128+16+4+2+1=663$. The port utilization (percentile value) may be determined by a relative value of the scaled port accumulated byte count, which may be represented as a percentile value computed by multiplying the sum (663) of the weighted values of all the set bits of the N-bit vector with the maximum statistic or port utilization percentile value (100%) and by further multiplying a (relative) step size: $663 \times 100\% \times \frac{1}{1024} = 64.74609375\%$. In the present example, the step size is $\frac{1}{1024}$ or one unit value (1) of N-bit values divided by the value range (1024) of all possible N-bit values. This step size ($\frac{1}{1024}$) represents the accuracy or precision of the N-bit vector in representing a mapped operational statistic value such as the port utilization. In some operational scenarios, the step size is inversely proportional to 2 to the power of the total number (N) of bits in the N-bit vector. Hence, the larger the N value is, the smaller the step size (relative to the entire value range of all possible N-bit values) is; the more accurate or precise the mapped statistic value or the port utilization (generated or mapped from the N-bit encoded vector) becomes.

N is a non-zero positive integer, which may or may not correspond to eight (8) or multiples of eight (8). Therefore, the N-bit encoded vector may or may not align with byte boundaries (e.g., one or more times 8 bits, etc.) or word boundaries (one or more times 16 bits, 32 bits or 64 bits, etc.). For example, a system or network node as described herein can be configured with an optimized N value—regardless of whether such N value is aligned with bit boundaries of bytes or words—for target accuracy or precision in representing mapped statistic values including but not limited to port utilizations. In addition to or in place of the target accuracy or precision, this N value may be selected or optimized from a plurality of candidate N values based on selection factors such as memory usage, computational cost, data throughput, total number of packet processing components or ports to be tracked or monitored, etc.

Under techniques as described herein, a relatively large number of N-bit encoded vectors can be generated or supported by the network node in real time or near real time (within a strict time budget of no more than a sampling period or less) over each sampling period of one or more sampling periods from input quantities such as those derived from data samples representing raw operational statistics or corresponding scaled quantities of these raw operational statistics, for the purpose of tracking, monitoring or mapping operational statistics of a relatively large number of packet processing components. Additionally, optionally or alternatively, regardless of whether an N bit value or encoded vector is aligned with byte or word boundaries, these N-bit encoded vector can be relatively efficiently stored, maintained and/or accessed using bit-level data/memory constructs such as bit maps, without needing to adding padding bits or padding bytes between or among the N-bit vectors and/or without needing to align individual N-bit encoded vectors with byte or word boundaries.

3.4. Iterative Encoding

FIG. 2D illustrates an example iterative (N-bit vector encoding) algorithm or process flow, which may be implemented or performed, for example, at the end of each sampling period/interval in a plurality of sampling periods/intervals, by the iterative encoded vector generator to generate encoded vectors from input or scaled statistics such as port accumulated byte counts (or bytes) of the plurality of ports of the network node. The iterative algorithm may be executed for each port in the plurality of ports, or for each port identifier in the plurality of port identifiers respectively identifying the plurality of ports.

Block 2202 of FIG. 2D comprises receiving a scaled port accumulated byte count of an individual port as identified by a corresponding port identifier. The port may or may not represent a maximum speed or throughput port of the network node. The scaled port accumulated byte count may be generated by scaling or applying a port-specific scaling factor to a pre-scaled or actual port accumulated byte count of the individual port as measured or generated for the sampling period or interval. The scaling factor may be set to a ratio of the maximum accumulable bytes (denoted as "max_accumulable_bytes") of the maximum speed or throughput port of the network node over a port-specific maximum accumulable bytes of the individual port.

The maximum accumulable bytes ("max_accumulable_bytes") may be configured for the iterative encoding algorithm of FIG. 2D based on the maximum (port level) speed/throughput among all (port level) speeds/throughputs of all (e.g., ingress, egress, etc.) ports of the network node. This maximum accumulable bytes ("max_accumulable_bytes") can then be used by the iterative encoding algorithm of FIG. 2D to generate N-bit encoded vectors for all the ports (e.g., all the ingress ports, all the egress ports, all ports of a specific type regardless of their port specific speeds/throughputs, etc.) of the network node.

Block 2204 of FIG. 2D comprises initializing an encoded vector to a null vector and initializing an encoding threshold to be ½ of the maximum accumulable bytes configured for the iterative encoding algorithm of FIG. 2D.

Blocks 2206-2216 of FIG. 2D comprise performing iterative encoding operations for N rounds to generate a (final or output) N-bit encoded vector from the scaled port accumulated byte count, following block 2204 in which the current round is set or initialized to Round 1 in the N rounds.

More specifically, in block 2206, it is determined whether the last round of the N rounds has been completed.

In response to determining that the last round of the N rounds has been completed, in block 2216, the encoded vector is outputted as an N-bit vector.

On the other hand, in response to determining that the last round of the N rounds has not been completed, in block 2208, it is determined whether the scaled port accumulated byte count is greater than the encoding threshold.

In response to determining that the scaled port accumulated byte count is greater than the encoding threshold, in block 2210, a set bit is added to the encoded vector or the end thereof. The scaled port accumulated byte count is deducted by the encoding threshold. The process flow goes to block 2214.

On the other hand, in response to determining that the scaled port accumulated byte count is no greater than the encoding threshold, in block 2212, an unset bit is added to the encoded vector or the end thereof. The process flow goes to block 2214, without deducting the scaled port accumulated byte count by the encoding threshold.

In block 2214, the encoding threshold is updated for the next round. For example, the encoding threshold is halved or is divided by a factor such as 2. The process flow then goes to block 2206 for iteration of the next round in the N rounds until Round N.

By way of example but not limitation, each sampling period may be a time interval of 1 micro-second (or 1 μsec). The maximum (port level) speed or throughput among the plurality of ports of the network node may be 800G bytes/second (or 800 Gbps). The maximum accumulable bytes at this maximum (port level) speed or throughput of 800 Gbps is 100,000 bytes. The scaled port accumulated byte count (or bytes) of the individual port (in reference to the maximum (port level) speed or throughput of 800 Gbps) during the (1 μsec) sampling period is 64,500 bytes. This represents a port utilization 64.5% in percentile, which may be computed by dividing the scaled port accumulated byte count of 64,500 by the maximum accumulable bytes ("max_accumulable_bytes") of 100,000 bytes. The iterative algorithm of FIG. 2D may encode this port utilization (or the corresponding scaled port accumulated byte count) into an output N-bit encoded vector.

As indicated in block 2204 of FIG. 2D, an encoded vector (denoted as "encoded_vector") to be outputted by the iterative algorithm may be first initialized to an empty or null vector containing zero (0) bits. For each input statistic to be converted or mapped to a N-bit encoded vector, a variable denoted as "encoding threshold" of the iterative algorithm may be first initialized to one half (½) of the maximum accumulable bytes ("max_accumulable_bytes"), as indicated in block 2204 of FIG. 2D.

Each of the (N=10) iterative rounds executed in a "for" loop (e.g., in blocks 2206-2216 of FIG. 2D) by the iterative algorithm adds a bit to the encoded vector ("encoded_vector") for a total number of N (10).

The scaled accumulated byte count (denoted as "scaled_accumulated_bytes") is greater than the encoding threshold in Round 1. This indicates that the individual port is at least 50% utilized. As the condition in block 2208 of FIG. 2D is evaluated true or yes, a set bit representing 50% utilization is added to (the right of) the encoded vector ("encoded_vector") in Round 1. Correspondingly, the scaled accumulated byte count ("scaled_accumulated_bytes") is subtracted by the encoding threshold ("encoding_threshold") representing the 50% utilization to generate a new scaled accumulated byte count above the encoding threshold to be used in the next iterative round or Round 2. Hence, after Round 1 is executed, the encoded vector is now a bit vector of a single bit.

Regardless of whether a set bit or an unset bit is added to the encoded vector, the iterative algorithm of FIG. 2D in block 2214 sets a new encoding threshold for the next iterative round to be one half (½) of the current encoding threshold at the end of each iterative round.

The (new) scaled accumulated byte count ("scaled_accumulated_bytes") is less than the (new) encoding threshold in Round 2. This indicates that the individual port is no more than 50%+25%=75% utilized. As the condition in block 2208 of FIG. 2D is evaluated false or no, an unset bit is added to (the right of) the encoded vector ("encoded_vector") in Round 2 in block 2212 of FIG. 2D. Note that there is no change to the scaled accumulated byte count ("scaled_accumulated_bytes"). The same scaled accumulated byte count will be used in the next iterative round or Round 3. Hence, after Round 2 is executed, the encoded vector is now a bit vector of two bits.

Hence, all N iterative rounds in the iterative algorithm of FIG. 2D are executed, the encoded vector may be outputted by the iterative vector encoder as a bit vector of N bits. In some operational scenarios, the N-bit encoded vector can be stored or written into a statistics map.

As illustrated in FIG. 2D, the iterative vector encoding algorithm under techniques as described herein is relatively light weight and hence can be completely executed with a relatively small number of well-formed computer instructions in real time or near real time within a relatively strict and predictable time budget. This algorithm or instances thereof can be executed relatively efficiently by the network node to generate a relatively large number of encoded bit vectors representing processed statistics for each of some or all packet processing components of the network node such as each port in the plurality of ports in the network node in parallel, in series, or partly in parallel and partly in series.

In some operational scenarios, a total number of parallel processing instances of the iterative algorithm of FIG. 2D executed by the network node may be scalable with actual workloads for operational statistics and encoded vector generation in the network node and may increase or decrease as a total number of the packet processing components such as a total number of the ports of the network node increases or decreases. It should be noted that a port as described herein may or may not be a physical port. Examples of a port as described herein may include, but are not necessarily limited to only, any of: a physical port, a logical port, a virtual port, a logical or virtual port formed by multiple physical ports, a logical or virtual port among multiple logical or virtual ports subdivided from a single physical port, etc. The network node may include different total numbers of ports at different times adaptively or dynamically depending at least in part on contemporaneous system configurations of the network node at these different times.

Hence, encoded bit vectors representing respective processed statistics of packet processing components over a given (e.g., each sampling period in a plurality of consecutive sampling periods, etc.) sampling period such as respective individual port utilizations over the given sampling period for the plurality of ports in the network node can be generated by the network node using the iterative algorithm and stored or written into a statistics map such as a bit map, for example within a strict time duration such as no longer than a time duration of a sampling period.

3.5. Statistics Mapping

Some or all encoded (bit) vectors may be retrieved from an input operational statistics map—generated by the operational statistics and encoded vector generator—and mapped by the statistics mapper to generate output or mapped statistics of packet processing components. Example output or mapped statistics generated from these encoded bit vectors may include, but are not necessarily limited to only, some or all of: instantaneous or average port utilization, instantaneous or average available bandwidth, instantaneous or average port rate, etc.

By way of example but not limitation, for a given (e.g., each, etc.) sampling period, a plurality of N-bit vectors representing a plurality of individual port utilizations of a plurality of ports in the network node are generated by the operational statistics and encoded vector generator. Each N-bit vector in the plurality of N-bit vectors corresponds to a respective individual port utilization for the sampling period, in the plurality of individual port utilizations, of a respective port in the plurality of ports.

The operational statistics and encoded vector generator can determine a plurality of respective (statistic) map offsets for the plurality of ports. In some operational scenarios, these respective map offsets can be determined based at least in part on one or more respective port attributes looked up in the first data store ("port_attributes") using a plurality of (distinct or respective) port identifiers ("port_id") of the plurality of ports as lookup keys. Each port identifier corresponds to or distinctly/uniquely identifies a respective port in the plurality of ports. Each map offset in the plurality of respective map offsets corresponds to or in part or in whole specifies or references a respective statistics map location for storing (and/or accessing) a respective N-bit vector for a respective port in the plurality of ports. Some or all of these techniques may be extended to other packet processing components such as queues. For example, the operational statistics and encoded vector generator can determine a plurality of respective (statistic) map offsets for a plurality of queues (e.g., of a port, etc.). In some operational scenarios, these respective map offsets can be determined based at least in part on one or more respective queue attributes looked up in a data store (denoted as "queue_attributes") using a plurality of (distinct or respective) queue identifiers (denoted as "queue_id") of the plurality of queues as lookup keys. Each queue identifier corresponds to or distinctly/uniquely identifies a respective queue in the plurality of queues. Each map offset in the plurality of respective map offsets corresponds to or in part or in whole specifies or references a respective statistics map location for storing (and/or accessing) a respective N-bit vector for a respective queue in the plurality of queues.

In some operational scenarios, the statistics map may include, or may be partitioned into, one or more map sections respectively for one or more types of ports. For example, a first set of encoded vectors for 800 Gbps ports of the network node for one or more sampling periods may be stored or written into a first map section of the statistics map; a second set of encoded vectors for 400 Gbps ports of the network node for the one or more sampling periods may be stored or written into a second map section of the statistics map; and so on.

Additionally, optionally, alternatively, the statistics map or a map section therein may include, or may be partitioned into, one or more map profiles for one or more different ports. For example, one or more first encoded vectors for one or more sampling periods for a first port of the network node may be stored or written into a first map profile of the statistics map; one or more second encoded vectors for the one or more sampling periods for a second port of the network node may be stored or written into a second map profile of the statistics map; and so on.

As a result, the plurality of N-bit vectors (or encoded values) for the plurality of ports for the given sampling period—e.g., each of the one or more sampling periods, etc.—may be stored as a plurality of profiles (or sets) of encoded vectors. The plurality of profiles or sets of encoded vectors can be accessed in the (operational) statistics map at a plurality of map locations respectively specified or referenced by the plurality of map offsets. Each profile of encoded vectors in the plurality of profiles of encoded vectors may represent a respective profile (or a respective set) of encoded vectors (e.g., N-bit encoded vectors, etc.) generated for a respective port in the plurality of ports for one or more (e.g., last, most recent, current, etc.) sampling periods.

The data extractor accesses each profile or set of encoded vectors—generated for the one or more sampling period for a respective port among the plurality of ports—among the plurality of profiles or sets of encoded vectors from the operational statistics map. A map location of the operational statistics map at which the profile or set of encoded vectors is located or accessed by the data extractor may be determined, deduced, inferred, and/or correlated to the port, at least in part based on a corresponding map offset assigned to the port. The profile or set of encoded vectors for the port includes one or more encoded vectors generated for the port for the one or more sampling periods. For example, the profile or set of encoded vectors for the port may include an encoded vector—e.g., representing a port utilization or loading of the port—for each of the one or more sampling periods. As noted, the operational statistics mapper, or the data extractor therein, can use the one or more encoded vectors in the profile or set of encoded vectors for the port, as extracted from the operational statistics map, to generate mapped statistics (e.g., encoded values in a bit array) for the port.

The mapped statistics generated from the one or more encoded vectors in the profile or set of encoded vectors for the port may be maintained, stored, cached or accessed in the output statistics map as a bit array of a specific number M (e.g., M=24, M=30, M=40, etc.) of bits encoded with mapped operational statistics for the port. In some operational scenarios, some or all bit arrays encoded with mapped operational statistics of some or all ports may be maintained, stored, cached, referenced or accessed in the output statistics map without padding bits or bytes inserting in between any two neighboring bit arrays in the output statistics map.

Each of the mapped operational statistics in the bit array for the port may be encoded—for example consecutively or sequentially without inserting any padding bits and/or without overlapping—starting at a specific start position of the bit array and ending at a specific bit length from the specific start position within the bit array. A start position of a pre-mapped or mapped operational statistic in a bit array as described herein may also be referred to as a base (bit position) of the pre-mapped or mapped operational statistic and may be specified or defined in relation to a reference position (e.g., the overall start bit position, etc.) in the bit array. Respective start positions and respective bit lengths of the mapped operational statistics encoded in the bit array for the port may be deduced, implemented or configured, for example at least partly in software, with the operational statistics mapper or the data extractor therein.

In some operational scenarios, some or all of these start positions and/or bit lengths of the mapped operational statistics encoded in the bit array may be displayed, controlled or specified by an operator or a designated user of the network node. For example, while a port utilization of the port for a sampling period captured in an encoded vector in the operational statistics map may have a 10-bit precision, the operator or user of the network node may specify—or cause the network node or the data extractor therein to use—a different precision or a different number of bits such as 5 bits to generate, look up, represent, and/or output, mapped port utilization information of the port from encoded vector(s) extracted from the operational statistics map. Hence, the data extractor may drop the least significant bit(s) in order to generate the different precision or different number of bits in the mapped port utilization information of the port as compared with the precision and number of bits of the encoded vector(s).

By way of illustration but not limitation, for any given sampling period, mapped statistics values in a bit array of 30 bits may be generated for a port from a profile or set of encoded vectors representing operational statistics—over one or more sampling periods including the sampling period—extracted from the operational statistics map. The mapped statistics values for the port for the given sampling period may comprise multiple mapped operational statistics or statistical values for the port for the given sampling period. Example mapped operational statistics as described herein may include some or all of: an instantaneous port utilization, an average port utilization, an instantaneous port rate, an average port rate, an instantaneous port available bandwidth, an average port available bandwidth, etc.

The statistics mapper may be configured with operational parameters that may be used to determine start and/or end bit positions of each of these mapped operational statistics encoded in the bit array of the output statistics map.

Example operational parameters for configuring the statistics mapper to reference or access mapped statistics in the bit array for the port may include, but are not necessarily limited to only, some or all of: average and/or instantaneous port utilization(s); average and/or instantaneous port rate(s); average and/or instantaneous port available bandwidth(s); and so on.

As used herein, for a given sampling period (e.g., corresponding to instantaneous statistic(s), etc.) or for a multi-sampling-period time window (e.g., corresponding to average statistic(s), etc.), the port utilization of a port (e.g., 100G port, etc.) may be computed as the ratio or percentile value of the total number of bytes (e.g., including IPGs, etc.) received and forwarded by the port over the maximum total number of bytes that can be received and/or forwarded by the port.

For a given sampling period (e.g., corresponding to instantaneous statistic(s), etc.) or for a multi-sampling-period time window (e.g., corresponding to average statistic(s), etc.), the port rate of a port (e.g., 100G port, etc.) may be computed as the port utilization of the port multiplied by the maximum port rate of the port.

For a given sampling period (e.g., corresponding to instantaneous statistic(s), etc.) or for a multi-sampling-period time window (e.g., corresponding to average statistic(s), etc.), the available bandwidth of a port (e.g., 100G port, etc.) may be computed as the difference between the maximum bandwidth (e.g., 100 Gbps, etc.) of the port and the utilized bandwidth of the port. Hence, an instantaneous available bandwidth (e.g., 20 Gbps for 80% port utilization, etc.) of a port (e.g., 100G port, etc.) for a given sampling period may be computed as the difference between the (instantaneous) maximum bandwidth (e.g., 100 Gbps, etc.) of the port and a corresponding instantaneous utilized bandwidth (e.g., 80 Gbps for 80% port utilization, etc.) of the port in the same sampling period. Likewise, an average available bandwidth (e.g., 20 Gbps for 80% port utilization, etc.) of a port (e.g., 100G port, etc.) for a given sampling period or time window may be computed as the difference between the (average) maximum bandwidth (e.g., 100 Gbps, etc.) of the port and a corresponding average utilized bandwidth (e.g., 80 Gbps for 80% port utilization, etc.) of the port for the same sampling period or time window.

A mapped statistics value for the port for the given sampling period may be generated from one or more encoded vectors in the profile or set of encoded vectors extracted from the operational statistics map using one or more mapping or encoding functions.

A sample or raw operational statistics collected therein for or during a specific sampling period may be used in part or in whole to derive instantaneous operational statistics of various types (e.g., port utilization, port rate, port available bandwidth, etc.) for the port for the specific sampling period.

Some or all instantaneous operational statistics of a specific type (e.g., port utilization, port rate, port available bandwidth, etc.) within a given time window such as a (e.g., two, three, four, etc.) consecutive-sampling-period window up to the last or current sample for a port may be averaged with equal weights or unequal weights to give rise to an average operational statistic of the specific type for the port up to the last or current sample in the given time window.

In some operational scenarios, for the given sampling period denoted as t, an average value including but not limited to an average value generated with an exponentially weighted moving average (EWMA) may be computed for each type of statistic.

The statistics mapper may be configured with one or more averaging controls stored or accessed as attributes or configuration parameters.

These averaging controls may include a weight parameter used to control respective weights between—or respective contributions from—an instantaneous statistic portion and an average statistic portion in an to-be-updated average statistic.

These averaging controls may also include a first attribute or configuration parameter used to enable modification to the average statistic such as the average port rate (statistic) that tracks—or allows the current average statistic to be updated into a new average statistic with—a new instantaneous statistic such as the new instantaneous port rate (statistic) if the new instantaneous statistic is greater than the current average statistic.

Conversely, these averaging controls may include a second attribute or configuration parameter used to enable modification to the average statistic such as the average port rate (statistic) that tracks—or allows the current average statistic to be updated into a new average statistic with—a new instantaneous statistic such as the new instantaneous port rate (statistic) if the new instantaneous statistic is no greater than the current average statistic.

In some operational scenarios, different statistics encoded in the output statistics map for the port for the given sampling period may be represented in different value type and/or different formats, different bit lengths, different precisions, etc. For example, an average statistic (or value) of a type of statistic such as port rate may be stored or encoded in the output statistics map as a k-bit value in an IEEE 754 or BFloat (e.g., BF16, etc.) floating point standard/format, where k represents a positive integer equaling the sum of sign bit, exponent bits and mantissa bits. In comparison, an instantaneous statistic (or value) of the same type of statistic or the port rate in the present example may be stored or encoded in the output statistics map as an integer.

Mapped operational statistics as described herein can be outputted as in-band telemetry data (e.g., via bytes inserted by network node in packets, etc.), or in a lookup table such as an output statistics map for a certain time duration such as until the end of the next sampling period when the latest mapped operational statistics for the next sampling period replace some or all mapped operational statistics for preceding sampling period(s) or time window. These operational statistics may be those of packet processing components such as ingress ports and/or egress ports in normal operational mode(s) and/or other modes.

By way of illustration but not limitation, mapped operational statistics as described herein can be used to generate in-band telemetry data in support of client- or operator-specific network performance or congestion management operations for a client or operator of network nodes or a network. Specific bytes in a network/data packet or a header thereof may be used to carry sampled or mapped operational statistics such as port utilization and bandwidth information as in-band telemetry data. These operational statistics can be used to identify or predict accumulative delays, network or path-specific bottlenecks, etc. Additionally, optionally or alternatively, the operational statistics can be used to determine what maximum transmission rate can be relatively safely (e.g., causing little or no packet loss, etc.) achieved in the network and/or specific paths and/or specific packet processing components of a network node.

A network node or a packet processor such as one operating with an ingress or egress port may insert in-band telemetry data in one or more consecutive packets. The in-band telemetry data may be generated by performing linear or non-linear mapping on the mapped operational statistics including but not limited to those related to utilization, rate and/or available bandwidth. From a representation of utilization in an encoded vector for a port, once the maximum port rate of the port is determined (e.g., by way of a port attribute such as 100G port, etc.), an actual port rate and available BW of the port can also be tracked or determined. Each set bit in the encoded vector provides a weighted value (e.g., times an applicable step size $1/1024$ depending on the number of bits used in encoded vectors, etc.) representing a portion of utilization or a portion of the maximum port rate that is being utilized.

In some operational scenarios, the in-band telemetry data may include portions representing a coarser version of some or all of port utilization, port rate and/or port available bandwidth of a port that are derived from encoded vectors generated from sampled or raw operational statistics collected for the port. The precision or accuracy of the encoded vectors in representing encoded operational statistics may be relatively high (e.g., 10 bit accuracy, etc.), for example equal to or greater than the precision or accuracy of the sampled or raw operational statistics giving rise to the encoded vectors. As a result, the port utilization, port rate and/or port available bandwidth of the port can be generated from the encoded vectors with relatively high precision or accuracy (e.g., 10 bits, etc.). In comparison, the precision or accuracy of the coarser version of the port utilization, port rate and/or port available bandwidth of the port in the in-band telemetry data portions may be relatively low (e.g., 4 bits, 6 bits, etc.).

In a non-limiting example, the in-band telemetry data portions may include a 10-bit array, in which the first four bits represent a coarser version of the port utilization while the last six bits represent a coarser version of the port available bandwidth.

Instead of directly outputting linear values such as available BW, non-linear values looked up from non-linear curves using the linear values may be outputted in in-band telemetry or congestion management information delivered by the network node to other nodes or external processors. Different operations may be performed depending on these values. For example, if the utilization below certain threshold, no congestion management information is outputted. Or a normal status may be indicated by the network node to other nodes or processors.

Various linear or non-linear representations of utilization, rate, available BW may be generated by the network node or components therein based on a recipient system's need. For example, if a recipient system of in-band or out-of-band telemetry data such as an end point—e.g., a user device, an access network node directly interfacing with a user device in a communication session, etc.—is only interested in getting individual port utilization information if port available BW of an individual port is below a certain threshold, then corresponding telemetry data about the utilization at a specific precision (e.g., 4 bit precision instead of 10 bit precision of underlying encoded vector(s) giving rise to the utilization, etc.) may be generated or mapped from the encoded vector(s) and provided to the recipient system only when the available BW of the individual port in a sampling period or time window dips or falls below the threshold. Additionally, optionally or alternatively, encoded vectors herein may be used by one or more machine learning based computer applications to determine operational statuses of network nodes or components therein. Operations such as vector embedding may be performed on the encoded vectors to map or convert the encoded vectors into vectors of different representations. These vectors of different representations may have a reduced vector data dimensionality and/or reduced data sizes, may be maintained or cached in storage (e.g., vector database or vectorDB, etc.), and may be used—instead of or in addition to the encoded vectors—in some or all of the ML-based computer applications as a part of training data to train machine learning prediction models and/or deep learning algorithms for predicting network operational statues with minimized prediction errors and/or as a part of input features to apply the trained ML prediction models and/or deep learning algorithms to obtain or monitor network operation statuses in real time or near real time.

Different types of ports may be signaled with different types of telemetry data including but not limited to different representations and/or different precisions of utilization, rate, available BW. For example, the network node may include ports of relatively low throughputs or bandwidth in the front and ports of relatively high throughputs or bandwidths in the back. The front ports such as 100 Gbps ports the network node may be signaled with first types of telemetry data, first representations and/or first precisions of mapped operational statistics, whereas back ports such as 800 Gbps ports the network node may be signaled with second different types of telemetry data, second different representations and/or second precisions of mapped operational statistics.

Types of mapped operational statistics, types of telemetry data, representations and/or precisions of mapped operational statistics and/or telemetry data can be defined based at least in part on user input provided by designated users (e.g., operators, administrators, etc.) of the network node or systems/processors used to manage or monitor the network node. For example, a designated user may relatively flexibly interact with the network node or a node management system to provide user input that specifies or configures precision/accuracy and numbers of bits used for various types of mapped operational statistics. A user can also interact with the network node or a node management system to provide user input that chooses or selects whether instantaneous and/or average statistics should be generated for mapped operational statistics and/or telemetry data as described herein. A user can interact with the network node or a node management system to provide user input that chooses or selects a specific type of averaging method with a specific set of operational parameters to generate average statistics. In some operational scenarios, a linear averaging method (e.g., fixed weight(s), equal weights, etc.) may be used to generate an average statistic of a specific type from instantaneous statistics of the same type in a moving time window (e.g., moving along in real time with sampling intervals up to the present time, etc.) with a fixed total number of consecutive sampling periods. In some operational scenarios, a non-linear averaging method (e.g., EWMA, etc.) may be used to generate an average statistic of a specific type from instantaneous statistics of the same type.

In some operational scenarios, telemetry data originated by the network node and received by a recipient device (e.g., another network node, a host processor, etc.) can be as simple as a single bit, a limited number of bits, a single byte, a limited number of bytes. Additionally, optionally or alternatively, in some operational scenarios, telemetry data may be generated when certain thresholds for telemetry data notifications have been crossed. For example, telemetry data such as a port's available bandwidth (BW) may be signaled when the port's utilization equals to or is higher than 80% utilization. As a result, when the network node or the port therein is relatively heavily loaded, a relatively small size of telemetry data is used to notify other network nodes, end point devices, or other external devices how loaded the network node or port is.

In some operational scenarios, the same total number of bits are used in the input (encoded vectors) and the output (mapped statistics). For example, for a total number of 10 bits of an encoded vector representing utilization in the input for a given sampling period, 4 bits in the output or mapped statistics may be used for instantaneous utilization with a coarser granularity or lower precision than represented in the encoded vector; 6 bits may be used for average utilization (for a time window up to the given sampling period) with a coarser granularity or lower precision than represented in the encoded vector. Base bit positions and length or numbers of bits can be specified via system and/or user configurable operational parameters.

Statistics and encoded vector generation and mapping operations as described herein can be performed in a distributed manner or in a centralized manner. Additionally, optionally or alternatively, maps or memories used to store or access statistics and/or encoded vectors as described herein can be in a distributed manner or in a centralized manner. In some operational scenarios, some or all data sampling and/or encoded vector generations such as illustrated in FIG. 2A can be performed in a distributed manner by a plurality of port-specific programming logics (e.g., hardware, software, a combination of hardware and software, etc.). In some operational scenarios, some or all statistics maps may be centralized (or may not be distributed over port-specific memories or registers of individual ports).

Map offsets, which can be determined as port attributes, may be used by operations as described herein to access individual profiles or sets of statistics and/or encoded data in these statistics maps. In some operational scenarios, some or all mapped operational statistics may be generated from encoded vectors at a centralized location or by an overall instance of statistics generation programming logic (e.g., hardware, software, a combination of hardware and software, etc.).

3.6. Congestion Control

A network (e.g., a data center network or DC network, a non-DC network, etc.) composed of network nodes as described herein can be used by a wide variety of end point devices (e.g., DC servers, non-DC servers, end user devices, mobile devices, non-mobile end user devices, etc.) connected to the network. An end point device can originate and receive network/data packets encapsulating the data, via the network, to and from one or more other endpoint devices. Example end point devices may include, but not necessarily limited to only, any, some or all of: user devices, relatively large data center server systems, application servers, etc., that utilize the network to exchange data with one another.

Operational statistics and/or metrics collected and generated for packet processing components of individual network nodes—e.g., access network nodes at or near the edge, non-access networks in the interior or core, etc.—in the network may be used by or incorporated into enhanced network management or control applications to support realtime or non-realtime network system operations and optimizations including but not limited to those relating to TCP-based and/or non-TCP-based congestion management (or control) protocols.

In some operational scenarios, TCP-based congestion management protocols and operations may be used to perform congestion controls. For example, a TCP end point device may keep increasing its transmission rate until relatively sharply backing off or reducing the transmission rate when packet loss occurs. The reduction of the transmission rate in such congestion management operations may be too significant to sustain or realize the maximum transmission rate supported by the underlying network devices or interfaces.

Additionally, optionally or alternatively, in some operational scenarios, tracing packets may be sent, transmitted, received and/or processed to determine round trip times of some if not all paths in a network. As the network is more or less loaded, network nodes and/or hops there between may experience more or less delays. As these delays accumulate, the round trip times may increase or decrease accordingly. These round trip times may be used to decrease or increase transmission rates of network nodes in the network. The modulation of transmission rates may take a relatively long time to reach an equilibrium as measurements of round trip times may take relatively numerous tracing packets and relatively long time or latency to complete.

Under techniques as described herein, in addition to or in place of existing network performance optimization operations, mapped operational statistics can be used to generate (e.g., out of band, in-band, etc.) metrics to support enhanced or novel network performance optimization operations and to help realize close to maximum possible transmission rates with relatively low latency supported by a network or network nodes therein.

The metrics generated from the mapped operational statistics and delivered to recipient devices such as end point devices can have variable degrees of accuracy and/or variable data formats, for example depending on specific needs of the recipient devices and/or depending on specific implementations of the network performance optimization operations. Multiple metrics having different degrees of accuracy and/or different formats may be generated from a single or common type of underlying mapped operational statistics. The degrees of accuracy in the metrics may be specified, configured, controlled or set by end point devices that are recipients of the metrics based at least in part on user inputs and/or system configurations.

In some operational scenarios, at least some of the metrics may be delivered or transmitted within end-to-end network/data packets (e.g., in headers, in extra or inserted data fields, carrying payloads for user applications other than those relating to the network performance optimization operations, etc.) to a recipient device or an end point device as in-band telemetry data.

While congestion control at runtime may be largely driven by end point devices, the network or network nodes therein—or external devices operating in conjunction with the network or network nodes—can transform mapped operational statistics into metrics of specific precisions (e.g., relatively high fidelity, relatively low fidelity, etc.) and/or specific formats (e.g., TCP based, QCN based, PFC based, HPCC based, etc.) that enable the end point devices to perform the congestion control relatively efficiently with much reduced processing overheads and bandwidth consumption.

In an example, the network or network nodes therein can alert the end point devices of present or impending congestions through marking packets with congestion notifications (e.g., each with a single bit or byte, etc.). Additionally, optionally or alternatively, specific metrics and/or mapped or operational statistics of specific formats and/or specific precisions can be provided by the network or network nodes to the end points to provide additional insights to the present or impending congestions relating to specific network and/or data paths within network nodes or between the network nodes. A data center end point operating with a TCP-based (e.g., data center TCP or DCTCP, etc.) or non-TCP-based (e.g., Priority-based Flow Control or PFC, Quantized Congestion Notification or QCN, Data Center QCN or DCQCN, High Precision Congestion Control or HPCC, etc.) congestion management implementation may receive data packets each with an ECN marking from a network node that detects events of utilization exceeding a specific utilization threshold. In some operational scenarios, the network node can mark the data packets with ECN markings more or less aggressively or with more or less frequency based at least in part on a rate of change (e.g., measured with a moving time window, etc.) of one or more types of mapped operational statistics or metrics. The end point receiving the ECN markings can adjust its rate of (network data or packet) transmission according to the received ECN markings over one or more specific network or data paths that involve the network node.

In another example, an end point device such as a data center communicating with another end point device such as a user device or the like may be provided with some or all mapped operational statistics as described herein and determine, select and/or operate with, based on the received mapped operational statistics, a specific transmission rate from a transmission rate mapping curve that output corresponding transmission rates based on mapped operational statistics as input. The specific transmission rate looked up from the curve may correspond to a probability of congestion as indicated, forecast and/or estimated based on the mapping operational statistics. As a result, the end points such as data centers and/or user devices may be able to adapt to respective optimized transmission rates corresponding to estimated probabilities of congestion and prevent or minimize packet loss in data transmission between these systems and/or devices.

Mapped operational statistics as described herein can be used to support existing and novel congestion management operations that may or may not be TCP-based. For example, a network node of a network or an end point device (other than the network nodes constituting the network) as described herein may select a subset of packets among all packets for relatively timely and responsive explicit congestion notification (ECN) marking (e.g., turn on a bit or more in a packet header, etc.) based on a congestion probability indicated in an ECN curve—e.g., a non-linear curve mapping some or all of the operational statistics as input to congestion probabilities as output, etc.—that output corresponding congestion probabilities based on mapped operational statistics as input. The congestion probability can be readily looked up from the ECN curve using some or all received or generated mapped operational statistics as input or lookup key(s). A packet origination end point device receiving ECN markings may reduce or modulate its (packet) transmission rate gradually or gracefully to reach an optimized or equilibrium transmission rate supported by the network or some or all individual network nodes therein. As a result, relatively dramatic transmission rate dropping off and/or relatively frequent retransmissions—e.g., when packet loss occurs—under some other approaches that do not implement techniques as described herein can be avoided or reduced, thereby significantly improving the overall network performance of the network in various network conditions.

In some operational scenarios, a network node in or operating with a data center may mark all packets transferred by a port with ECN markings, in response to determining that a (realtime or near real time) port utilization of the port exceeds a maximum port utilization threshold and/or that a (realtime or near real time) port available bandwidth of the port is below a minimum port available bandwidth threshold. The network node may mark no packets transferred by the port with ECN markings, in response to determining that a (realtime or near real time) port utilization of the port is below a lower port utilization threshold and/or that a (realtime or near real time) port available bandwidth of the port exceeds a higher port available bandwidth threshold. The network node may randomly and/or selectively and/or in a round-robin manner mark a subset of packets transferred by the port with ECN markings, in response to determining that a (realtime or near real time) port utilization of the port is between the lower and maximum port utilization thresholds and/or that a (realtime or near real time) port available bandwidth of the port is between the minimum and higher port available bandwidth thresholds. The probability of any of these packets to be marked may be indicated from a specific probability looked up with the ECN curve.

3.7. Traffic Engineering

Operational statistics and/or metrics as described herein may be used by or incorporated into enhanced network management or control applications to support realtime or non-realtime traffic engineering operations in the network. These operations help prevent or reduce possibilities of packet losses in the network as well as to reduce latencies and load imbalance among or between the network nodes, hops and/or network data paths in the network.

The statistics and/or metrics may include, but are not necessarily limited to only, realtime bandwidth information such as consumed/used bandwidth or available bandwidth of a given network node (or a port therein) and/or a given network hop and/or a given network data path. Some or all of these metrics can be shared within and/or without the network node such as other network nodes upstream (and forwarding packets in traffic flows) to the network node.

By way of example but not limitation, a network node can share or exchange statistics and/or metrics with nearby devices such as upstream network node(s) in a network traffic flow along a path connecting two or more end point devices. As a result, the upstream devices or network nodes can start steering or diverting incoming network traffic away from the network node if the latter node has relatively low available bandwidths.

An external computing system (e.g., a network traffic engineering system, a network management system, a network element management system, a system operating with a data center network, etc.) may collect statistics and/or metrics such as realtime bandwidth information from some or all of the network nodes in the network to form realtime global and/or local views of available bandwidths relating to network nodes, hops and/or paths in the network. The external computing system can use the collected statistics and/or metrics from the network nodes of the network to generate realtime global and/or local views relating to congestions, packet losses, latencies, etc., that may occur in the network.

The external system can determine how much bandwidth is available on a particular path by determining the minimum available bandwidth among all available bandwidths in all the nodes, ports or hops that constitute the particular path. The available bandwidths may represent relatively important measures as compared with corresponding used bandwidths in these nodes, ports or hops, as different nodes and/or different ports and/or different hops along the particular path may have different maximum capacities and hence real time available bandwidths.

In an example, these statistics and/or metrics can help identify per-path and/or per-node and/or per-hop available bandwidths in network data paths for a traffic flow between or among two or more given end points. One or more of these network data paths can be selected at runtime for steering or offloading some or all incoming network data traffic away from a current network data path, in response to determining that the current network data path has available or unused bandwidth below minimum available bandwidth threshold(s).

In another example, one or more alternative network data paths between or among two or more given end point devices can be selected for steering or offloading some or all incoming network data traffic away from the current network data path, in response to determining, based on bandwidth information in the statistics and/or metrics, that the current network data path may be relatively busy or heavily utilized as compared with the selected alternative network data paths as indicated by the statistics and/or metrics.

Load balancing among different paths or among different ports traversed by these paths can be enabled by the statistics and/or metrics and (e.g., internally, etc.) performed by a network node or an external computing device. The network node or external computing device may implement one or more automatic load balancing methods/algorithms/functions for selecting specific paths or ports for forwarding packets. Some or all of the statistics and/or metrics such as available bandwidths can serve as input to these methods/ algorithms/functions used for realtime path selection.

3.8. Capacity Constraints

Dynamic and/or static capacity constraints associated with the network or network nodes therein may be used— along with (e.g., realtime, etc.) operational statistics and/or metrics generated from the network or network nodes—by enhanced network management or control applications to support realtime or non-realtime network management operations in the network.

Like traffic engineering operations based on available bandwidths, the network management operations as enabled using the capacity constraints along with the operational statistics and/or metrics can help prevent or reduce possibilities of packet losses in the network as well as to reduce latencies and load imbalance among or between the network nodes, hops and/or network data paths in the network.

The capacity constraints indicate configured or real time constraints or limits of capacities of various (e.g., other than available bandwidths, available network nodes or elements, available ports, available buffers, available queues, available table resources, etc.) resources used by the network or network nodes to process and transfer packets originating from end point devices. Example capacity constraints may include, but are not necessarily limited to only, available buffers, queues, ports, logical or physical partitions and/or aggregations thereof, available table resources, etc., of individual network nodes (or packet processing components therein) in the network and/or a given network hop and/or a given network data path. Some or all capacity constraints of a network node can be shared within and/or without the network node.

An external computing system (e.g., a network traffic engineering system, a network management system, a network element management system, etc.) may receive realtime or configured capacity constraints from the network or network nodes. These capacity constraints along with statistics and/or metrics collected in realtime or near realtime from some or all of the network nodes in the network to form a global or broad view of capacity constraints as well as resource utilizations of the network including views relating to congestions, packet losses, latencies, etc., that may occur in the network.

In some operational scenarios, capacity constraints can be used along with statistics and/or metrics to define or generate specific device statuses and/or specific operational states of individual network nodes or components/devices therein. The device statuses and/or operational states can be used by a network node or an external computing device for steering packet traffic in new or existing traffic flows among different network nodes, different ports, different hops, different paths, etc., such that the steered packet traffic can be handled with available bandwidth and/or non-bandwidth resources by selected or steered network nodes, ports, hops, paths, etc.

In an example, the capacity constraint, statistics and/or metrics can help identify and provision network packet processing capacities and corresponding constraints/limits along network data paths between or among two or more given end points. One or more network data paths can be selected for steering or offloading some or all incoming network data traffic away from the current network data path, in response to determining that the current network data path exceeds maximum capacity threshold(s) or has available or unused capacity below minimum available capacity threshold(s).

In another example, one or more alternative network data paths between or among two or more given end point devices can be selected for steering or offloading some or all incoming network data traffic away from the current network data path, in response to determining that the current network data path may be relatively busy or heavily utilized as compared with the selected alternative network data paths as indicated by the capacity constraints, statistics and/or metrics.

Load balancing among different current or alternative paths or among different ports traversed by these paths can be enabled by the capacity constraints, statistics and/or metrics and (e.g., internally, etc.) performed by a network node implementing one or more path selection or load balancing methods/algorithms/functions. Some or all of the capacity constraints, statistics and/or metrics can serve as input to one or more auto load balancing algorithms used for realtime path selection.

The selection of specific paths for carrying packets in a network/data flow between or among the end point devices may be implemented or performed as a part of an auto load balancing module/mechanism implemented by a network node or external computing device. For example, load balancing among paths and/or ports and/or network nodes can be enabled by the capacity constraints, statistics and/or metrics and (e.g., externally, etc.) performed by an external computing system external to the network nodes of the network implementing one or more path selection or load balancing methods/algorithms/functions.

The external system can use the constraints, statistics and/or metrics to generate a global network-wide view or state of congestion, capacity, resource utilization information, used and/or available bandwidths for various hops and paths between or among end point devices originating or receiving packets via the network and use such view to perform traffic engineering operations such as diverting realtime traffic from relatively busy nodes or paths and balancing realtime workloads among the network paths, nodes and/or packet processing components in the nodes.

The external system may implement or perform load balancing and/or traffic steering operations such as increase and decrease overall path utilization more aggressively if needed in accordance with individual as well as overall capacity constraints, path utilizations and available bandwidths in the current and/or alternative paths. For example, the external system may determine or mark, based on the received statistics and/or metrics, that a network node or a packet processing component such as a port therein is in a problematic condition such as over 90% utilization of its configured capacity constraints. The external system may avoid introducing any new packet flow to a path that traverses the network node or the packet processing component therein until the condition is cleared.

A network node can share or exchange capacity constraints, statistics and/or metrics as described herein with other network nodes (e.g., in the same network, etc.). By way of example but not limitation, the network node can share or exchange the capacity constraints, statistics and/or metrics with nearby devices such as upstream network node(s) in a network traffic flow along a path connecting two or more end point devices. In some operational scenarios, scopes and types of statistics/metrics shared among the different network devices may vary depending on local device statuses and/or operational states of these network devices. For example, a network node with 90% utilization (e.g., equal to or above a configured maximum utilization threshold, below a configured minimum available bandwidth threshold, etc.) may be configured to share or exchange specific scopes and/or types of the capacity constraints, statistics and/or metrics with other network nodes, whereas the same network device with less than 90% utilization (e.g., below a configured maximum utilization threshold, equal to or above a configured minimum available bandwidth threshold, etc.) may be configured not to share or exchange the specific scopes and/or types of the capacity constraints, statistics and/or metrics with the other network nodes. As a result, the upstream devices or network nodes can start steering or diverting incoming network traffic away from the network node if the latter node experiences relatively high utilization relative to the applicable capacity constraints.

Additionally, optionally or alternatively, some or all of these network nodes can share device status and operational state information, statistics and/or metrics with a centralized (e.g., external, dedicated, etc.) management system to alleviate capacity problems in these network nodes or the network with relatively sophisticated controls based on a global view of the network as well as individual views of the network nodes.

3.9. Monitoring Framework

Figure 4:
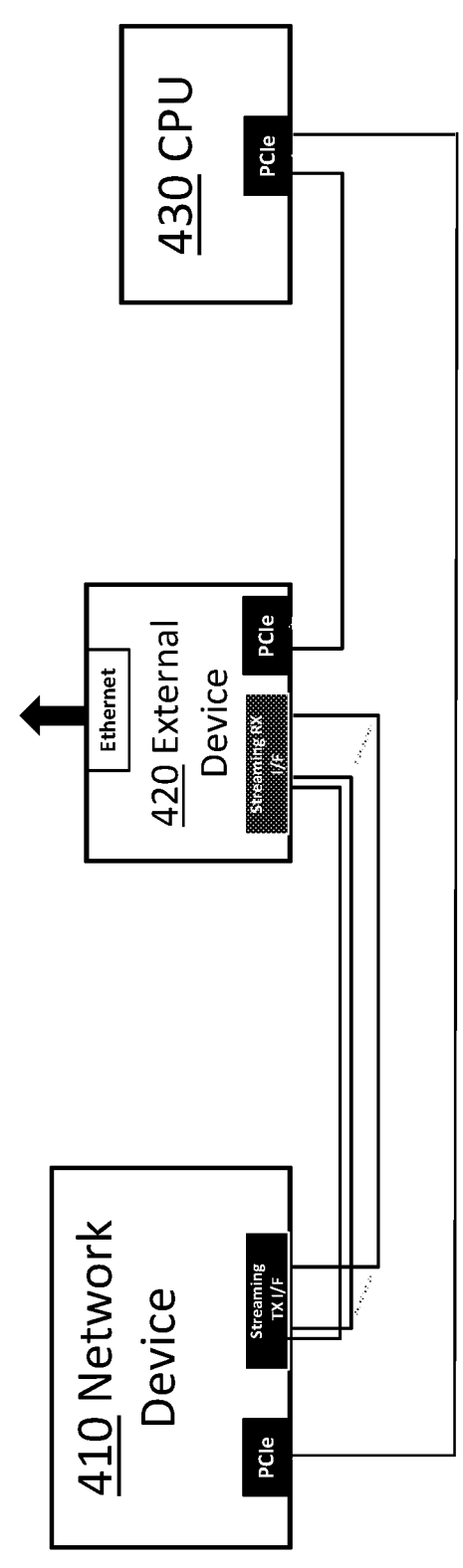
FIG. 4 illustrates an example network monitoring framework.

FIG. 4 illustrates an example network monitoring framework 400 that may be implemented with one or more computing devices. These computing devices may include one or more memories storing instructions for implementing various components described herein, one or more hardware processors configured to execute the instructions stored in the one or more memories, and various data repositories in the one or more memories for storing data structures utilized and manipulated by various components.

For the purpose of illustration only, an external device 420 (e.g., FPGA implemented chipset or add-on card, etc.) and a network node or device 410 as described herein may be operatively linked to each other as well as communicated with a host computing device denoted as CPU 430 via one or more data communication interfaces. For the purpose of illustration only, the external device 420 and the network device 410 each are communicated with the CPU 430 via PCIe or CXL interfaces implemented on these devices.

Utilization samples are generated with the network device 410. The utilization samples can be used by the network device 410 and/or the external device 420 and/or the CPU 430 to generate encoded vectors, mapped statistics and/or metrics.

Some or all capacity constraints, mapped statistics and/or metrics of network nodes in a network including but not limited to the network device 410 may be exchanged or communicated between the network nodes and the external device 420 using streaming transmitting (TX) and streaming receiving (RX) interfaces (I/Fs). The capacity constraints, mapped statistics and/or metrics may be buffered in the external device 420 along with realtime or non-realtime generated by the external device 420. The cached data at the external device 420 may be accessed and processed by the CPU 430. Additionally, optionally or alternatively, the cached data at the external device 420 may be accessed and processed by the CPU 430 and/or other recipient devices, for example via other (e.g., Ethernet, etc.) reporting or communication interfaces.

Network nodes or devices as described herein can be time-synchronized with one another and/or with monitoring devices/components for example using IEEE 1588 protocols.

4.0. EXAMPLE EMBODIMENTS

FIG. 5 illustrates an example process flow, according to an embodiment. The various elements of the flow described below may be performed by one or more network devices (e.g., a single network node, one or more network nodes, etc.) implemented with one or more computing devices. In block 502, the network devices scale a pre-scaled accumulated byte count of a port of a network node over a sampling period with a scaling factor to generate a scaled accumulated byte count. The pre-scaled accumulated byte count represents a total number of bytes in packets transferred by the port of a network node. The scaling factor represents a first port-specific attribute of the port and scales a port-specific maximum throughput of the port to a specific maximum port throughput of the network node.

In block 504, the network devices apply an iterative vector encoding method to the scaled accumulated byte count to generate an encoded bit vector comprising a plurality of bits respectively in a plurality of ordered bit positions. Each set bit of the encoded bit vector represents a respective weighted value of port utilization of the port.

In block 506, the network devices store, at a map location at least in part determined by a map offset associated with the port, the encoded bit vector in an operational statistics map.

In an embodiment, the network devices are configured to further perform: retrieving, from the operational statistics map, one or more encoded bit vectors in a set of encoded bit vectors for the port, the one or more encoded bit vectors including the encoded bit vector from the operational statistics map; generating a mapped value encoded with one or more mapped operational statistics of the port from the one or more encoded bit vectors in the set of encoded bit vectors retrieved from the operational statistics map.

In an embodiment, the mapped value is encoded with one of an instantaneous statistic of the port, or an average statistic of the port.

In an embodiment, the average statistic of the port represents an exponentially weighted moving average (EWMA) statistic.

In an embodiment, the iterative vector encoding method receives the scaled accumulated byte count and the maximum port throughput of the network node as input; the iterative vector encoding method generates the encoded bit vector as output; the iterative vector encoding method includes: initializing the encoded bit vector to a null bit vector; setting an encoding threshold to one half of the maximum port throughput; for each round in a plurality of rounds from a first round to a second round, performing: adding a set bit after a bit position corresponding to the lowest significant bit position in the encoded bit vector in response to determining that the scaled accumulated byte count is greater than the encoding threshold; adding an unset bit after the bit position in response to determining that the scaled accumulated byte count is no greater than the encoding threshold; reducing the scaled accumulated byte count by subtracting the encoding threshold from the scaled accumulated byte count; setting the encoding threshold for the next round to one half of the encoding threshold.

In an embodiment, the port represents one of: an ingress port or an egress port.

In an embodiment, mapped operational statistics are generated from encoded vectors in the operational statistics map to optimize data communication operations of a computer network that includes the network node.

In an embodiment, metrics of two or more different precisions are generated from a single mapped operational statistic in the mapped operational statistics.

In an embodiment, the optimized data communication operations are performed based at least in part on capacity constraints of network nodes in the computer network; the optimized data communication operations include one or more of: congestion management operations, traffic engineering operations, or automatic load balancing operations.

In an embodiment, a computing device such as a switch, a router, a line card in a chassis, a network device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

5.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 6:
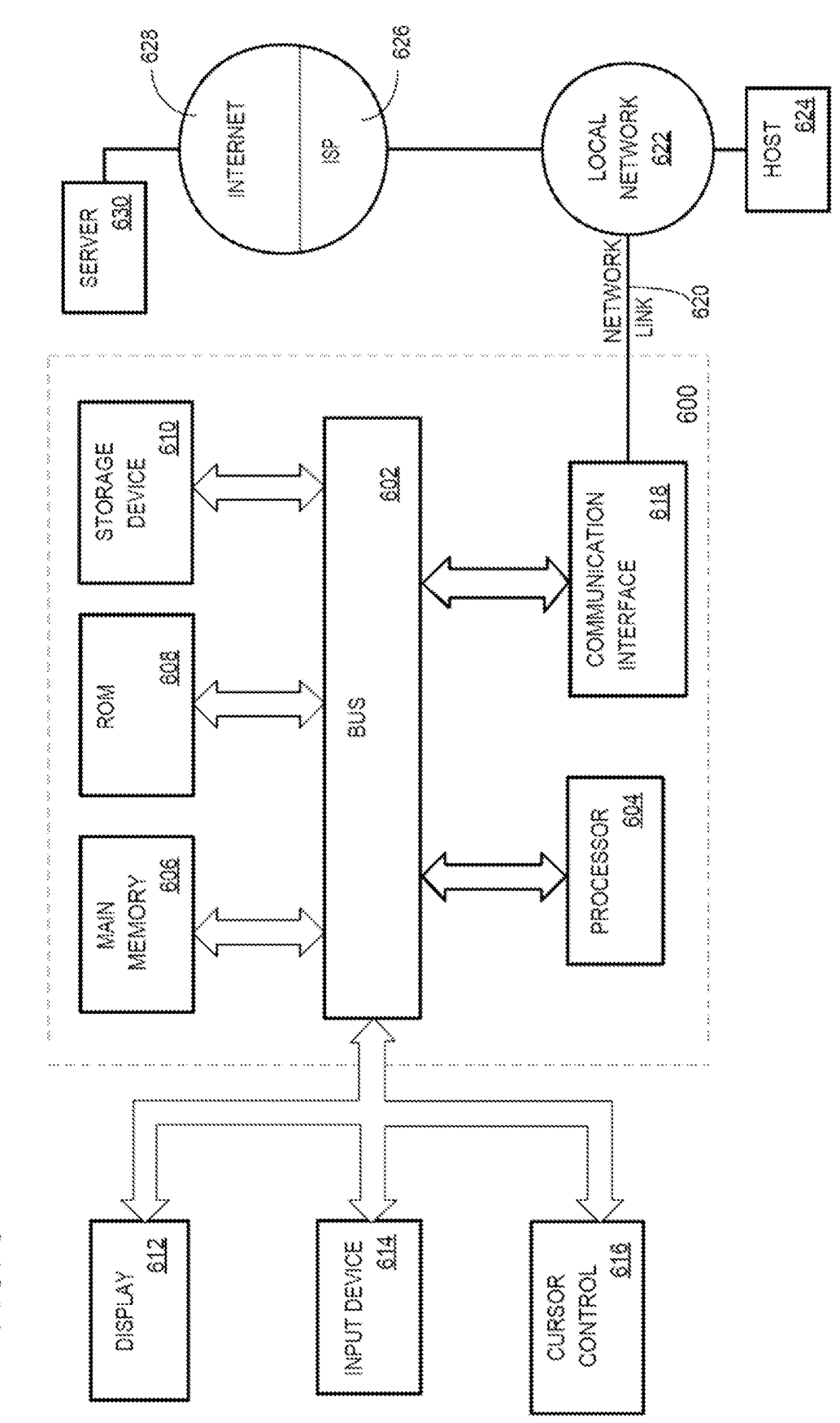
FIG. 6 is block diagram of an example computer system upon which embodiments of the inventive subject matter may be implemented.

FIG. 6 is a block diagram that illustrates an example computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device. In an embodiment, FIG. 6 constitutes a different view of the devices and systems described in previous sections.

Computer system 600 may include one or more ASICs, FPGAs, or other specialized circuitry 603 for implementing program logic as described herein. For example, circuitry 603 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 600 may include one or more hardware processors 604 configured to execute software-based instructions. Computer system 600 may also include one or more busses 602 or other communication mechanism for communicating information. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes one or more memories 606, such as a RAM, hardware registers, or other dynamic or volatile storage device for storing data units to be processed by the one or more ASICs, FPGAs, or other specialized circuitry 603. Memory 606 may also or instead be used for storing information and instructions to be executed by processor 604. Memory 606 may be directly connected or embedded within circuitry 603 or a processor 604. Or, memory 606 may be coupled to and accessed via bus 602. Memory 606 also may be used for storing temporary variables, data units describing rules or policies, or other intermediate information during execution of program logic or instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, may optionally be provided and coupled to bus 602 for storing information and instructions.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as an 802.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send and receive data units through the network(s), network link 620, and communication interface 618. In some embodiments, this data may be data units that the computer system 600 has been asked to process and, if necessary, redirect to other computer systems via a suitable network link 620. In other embodiments, this data may be instructions for implementing various processes related to the described techniques. For instance, in the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

Computer system 600 may optionally be coupled via bus 602 to one or more displays 612 for presenting information to a computer user. For instance, computer system 600 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

One or more input devices 614 are optionally coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

As discussed, computer system 600 may implement techniques described herein using customized hard-wired logic, one or more ASICs or FPGAs 603, firmware and/or program logic, which in combination with the computer system causes or programs computer system 600 to be a special-purpose machine. According to one embodiment, however, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 600 can receive the data on the network and demodulate the signal to decode the transmitted instructions. Appropriate circuitry can then place the data on bus 602. Bus 602 carries the data to main memory 606, from which processor 604 retrieves and executes the instructions. The instructions received by main memory 606 may optionally be stored on storage device 610 either before or after execution by processor 604.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components.

Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
scaling a pre-scaled accumulated byte count of a port of a network node over a sampling period with a scaling factor to generate a scaled accumulated byte count, wherein the pre-scaled accumulated byte count represents a total number of bytes in packets transferred by the port of a network node, wherein the scaling factor represents a first port-specific attribute of the port and scales a port-specific maximum throughput of the port to equal a specific maximum port throughput of the network node;
applying an iterative vector encoding method to the scaled accumulated byte count to generate an encoded bit vector comprising a plurality of bits respectively in a plurality of ordered bit positions, wherein each set bit of the encoded bit vector represents a respective weighted value of port utilization of the port;
storing, at a map location at least in part determined by a map offset associated with the port, the encoded bit vector in an operational statistics map.

2. The method of claim 1, further comprising:
retrieving, from the operational statistics map, one or more encoded bit vectors in a set of encoded bit vectors for the port, wherein the one or more encoded bit vectors include the encoded bit vector from the operational statistics map;
generating a mapped value encoded with one or more mapped operational statistics of the port from the one or more encoded bit vectors in the set of encoded bit vectors retrieved from the operational statistics map.

3. The method of claim 2, wherein the mapped value is encoded with one of an instantaneous statistic of the port, or an average statistic of the port.

4. The method of claim 3, wherein the average statistic of the port represents an exponentially weighted moving average (EWMA) statistic.

5. The method of claim 1, wherein the iterative vector encoding method receives the scaled accumulated byte count and the maximum port throughput of the network node as input; wherein the iterative vector encoding method generates the encoded bit vector as output; wherein the iterative vector encoding method includes:
initializing the encoded bit vector to a null bit vector;
setting an encoding threshold to one half of the maximum port throughput;
for each round in a plurality of rounds from a first round to a second round, performing:
adding a set bit after a bit position corresponding to the lowest significant bit position in the encoded bit vector in response to determining that the scaled accumulated byte count is greater than the encoding threshold;
adding an unset bit after the bit position in response to determining that the scaled accumulated byte count is no greater than the encoding threshold;
reducing the scaled accumulated byte count by subtracting the encoding threshold from the scaled accumulated byte count;
setting the encoding threshold for the next round to one half of the encoding threshold.

6. The method of claim 1, wherein the port represents one of: an ingress port or an egress port.

7. The method of claim 1, wherein mapped operational statistics are generated from encoded vectors in the operational statistics map to optimize data communication operations of a computer network that includes the network node.

8. The method of claim 7, wherein metrics of two or more different precisions are generated from a single mapped operational statistic in the mapped operational statistics.

9. The method of claim 7, wherein the optimized data communication operations are performed based at least in part on capacity constraints of network nodes in the computer network; wherein the optimized data communication operations include one or more of: congestion management operations, traffic engineering operations, or automatic load balancing operations.

10. A system comprising:
one or more computing devices;
one or more non-transitory computer readable media storing instructions that, when executed by the one or more computing devices, cause performance of:
scaling a pre-scaled accumulated byte count of a port of a network node over a sampling period with a scaling factor to generate a scaled accumulated byte count, wherein the pre-scaled accumulated byte count represents a total number of bytes in packets transferred by the port of a network node, wherein the scaling factor represents a first port-specific attribute of the port and scales a port-specific maximum throughput of the port to equal a specific maximum port throughput of the network node;
applying an iterative vector encoding method to the scaled accumulated byte count to generate an encoded bit vector comprising a plurality of bits respectively in a plurality of ordered bit positions, wherein each set bit of the encoded bit vector represents a respective weighted value of port utilization of the port;

storing, at a map location at least in part determined by a map offset associated with the port, the encoded bit vector in an operational statistics map.

11. The system of claim 10, wherein the instructions, when executed by the one or more computing devices, cause further performance of:

retrieving, from the operational statistics map, one or more encoded bit vectors in a set of encoded bit vectors for the port, wherein the one or more encoded bit vectors include the encoded bit vector from the operational statistics map;

generating a mapped value encoded with one or more mapped operational statistics of the port from the one or more encoded bit vectors in the set of encoded bit vectors retrieved from the operational statistics map.

12. The system of claim 11, wherein the mapped value is encoded with one of an instantaneous statistic of the port, or an average statistic of the port.

13. The system of claim 12, wherein the average statistic of the port represents an exponentially weighted moving average (EWMA) statistic.

14. The system of claim 10, wherein the iterative vector encoding method receives the scaled accumulated byte count and the maximum port throughput of the network node as input; wherein the iterative vector encoding method generates the encoded bit vector as output; wherein the iterative vector encoding method includes:

initializing the encoded bit vector to a null bit vector;

setting an encoding threshold to one half of the maximum port throughput;

for each round in a plurality of rounds from a first round to a second round, performing:

adding a set bit after a bit position corresponding to the lowest significant bit position in the encoded bit vector in response to determining that the scaled accumulated byte count is greater than the encoding threshold;

adding an unset bit after the bit position in response to determining that the scaled accumulated byte count is no greater than the encoding threshold;

reducing the scaled accumulated byte count by subtracting the encoding threshold from the scaled accumulated byte count;

setting the encoding threshold for the next round to one half of the encoding threshold.

15. The system of claim 10, wherein the port represents one of: an ingress port or an egress port.

16. The system of claim 10, wherein mapped operational statistics are generated from encoded vectors in the operational statistics map to optimize data communication operations of a computer network that includes the network node.

17. The system of claim 16, wherein metrics of two or more different precisions are generated from a single mapped operational statistic in the mapped operational statistics.

18. The system of claim 16, wherein the optimized data communication operations are performed based at least in part on capacity constraints of network nodes in the computer network; wherein the optimized data communication operations include one or more of: congestion management operations, traffic engineering operations, or automatic load balancing operations.

19. One or more non-transitory computer readable media storing instructions that, when executed by one or more computing devices, cause performance of:

scaling a pre-scaled accumulated byte count of a port of a network node over a sampling period with a scaling factor to generate a scaled accumulated byte count, wherein the pre-scaled accumulated byte count represents a total number of bytes in packets transferred by the port of a network node, wherein the scaling factor represents a first port-specific attribute of the port and scales a port-specific maximum throughput of the port to equal a specific maximum port throughput of the network node;

applying an iterative vector encoding method to the scaled accumulated byte count to generate an encoded bit vector comprising a plurality of bits respectively in a plurality of ordered bit positions, wherein each set bit of the encoded bit vector represents a respective weighted value of port utilization of the port;

storing, at a map location at least in part determined by a map offset associated with the port, the encoded bit vector in an operational statistics map.

20. The one or more non-transitory computer readable media of claim 19, wherein the instructions, when executed by the one or more computing devices, cause further performance of:

retrieving, from the operational statistics map, one or more encoded bit vectors in a set of encoded bit vectors for the port, wherein the one or more encoded bit vectors include the encoded bit vector from the operational statistics map;

generating a mapped value encoded with one or more mapped operational statistics of the port from the one or more encoded bit vectors in the set of encoded bit vectors retrieved from the operational statistics map.

* * * * *